(12) United States Patent
Maly et al.

(10) Patent No.: US 12,008,449 B2
(45) Date of Patent: *Jun. 11, 2024

(54) SYSTEM, METHOD, AND COMPUTER PROGRAM PRODUCT FOR ITERATIVELY REFINING A TRAINING DATA SET

(71) Applicant: Visa International Service Association, San Francisco, CA (US)

(72) Inventors: Olivia Maly, Singapore (SG); Anubhav Narang, Singapore (SG); Nuri Vinod Purswani Ramchandani, Singapore (SG); Spiridon Zarkov, Singapore (SG); Chuxin Liao, Singapore (SG)

(73) Assignee: Visa International Service Association, San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/206,674

(22) Filed: Jun. 7, 2023

(65) Prior Publication Data

US 2023/0316148 A1     Oct. 5, 2023

Related U.S. Application Data

(63) Continuation of application No. 17/953,488, filed on Sep. 27, 2022, now Pat. No. 11,715,041, which is a continuation of application No. 16/844,346, filed on Apr. 9, 2020, now Pat. No. 11,488,065.

(51) Int. Cl.
   *G06N 20/00*     (2019.01)
   *G06N 5/02*     (2023.01)

(52) U.S. Cl.
   CPC .............. *G06N 20/00* (2019.01); *G06N 5/02* (2013.01)

(58) Field of Classification Search
None
See application file for complete search history.

(56) References Cited

U.S. PATENT DOCUMENTS

| | | | |
|---|---|---|---|
| 8,554,653 B2 | 10/2013 | Falkenborg et al. | |
| 8,566,327 B2 * | 10/2013 | Carrico | G06F 16/3331 |
| | | | 707/748 |
| 9,483,778 B2 * | 11/2016 | Tuzhilin | G06Q 30/0201 |
| 9,849,388 B2 * | 12/2017 | Cohen | A63F 13/67 |
| 11,316,941 B1 * | 4/2022 | Jain | H04L 41/0816 |
| 11,361,846 B1 * | 6/2022 | Jain | G16H 20/10 |
| 2009/0271228 A1 * | 10/2009 | Bilenko | G06Q 30/02 |
| | | | 705/7.29 |
| 2012/0284080 A1 * | 11/2012 | De Oliveira | G06Q 30/0201 |
| | | | 705/7.29 |

* cited by examiner

*Primary Examiner* — Atta Khan
(74) *Attorney, Agent, or Firm* — The Webb Law Firm

(57) ABSTRACT

Provided are methods for iteratively refining a training data set which may include training a first predictive model based on a first set of user profiles; determining a classification for each user profile of a second set of user profiles; determining a performance score for the first predictive model; determining to update the first predictive model based on the performance score for the first predictive model; determining a classification for each user profile of the first set of user profiles using the first predictive model; and selecting at least one user profile of the first set of user profiles to include in a removal set of user profiles. In some non-limiting embodiments or aspects, the method may include removing each user profile included in the removal set of user profiles from the first set of user profiles. Systems and computer program products are also provided.

20 Claims, 12 Drawing Sheets

400

| Classification for each user profile of the second set of user profiles generated by first predictive model | | Predetermined classification for each user profile | | Difference between classification and predetermined classification |
|---|---|---|---|---|
| Profile_5<br>First Profile Type<br>[Class.: .3] | - | Profile_5<br>First Profile Type<br>[Class.: .3] | = | Profile_5<br>0.00 |
| Profile_6<br>First Profile Type<br>[Class.: .35] | - | Profile_5<br>First Profile Type<br>[Class.: .3] | = | Profile_6<br>0.05 |
| Profile_7<br>Second Profile Type<br>[Class.: .70] | - | Profile_5<br>First Profile Type<br>[Class.: .55] | = | Profile_7<br>0.15 |
| Profile_8<br>Second Profile Type<br>[Class.: .45] | - | Profile_5<br>First Profile Type<br>[Class.: .65] | = | Profile_8<br>0.20 |

Profile Analysis System
402

Compare the classification for each user profile of the second set of user profiles to a predetermined classification for each user profile of the second set of user profiles
430

| Difference between classification and predetermined classification |
|---|
| Profile_5 0.00 |
| Profile_6 +0.05 |
| Profile_7 +0.15 |
| Profile_8 +0.20 |

$$.4 = \frac{.4}{4} = .1$$

(number of classifications) (performance score)

Determine a performance score for the first predictive model based on the classification of each user profile of the second set of user profiles
435

Profile Analysis System
402

FIG. 4E

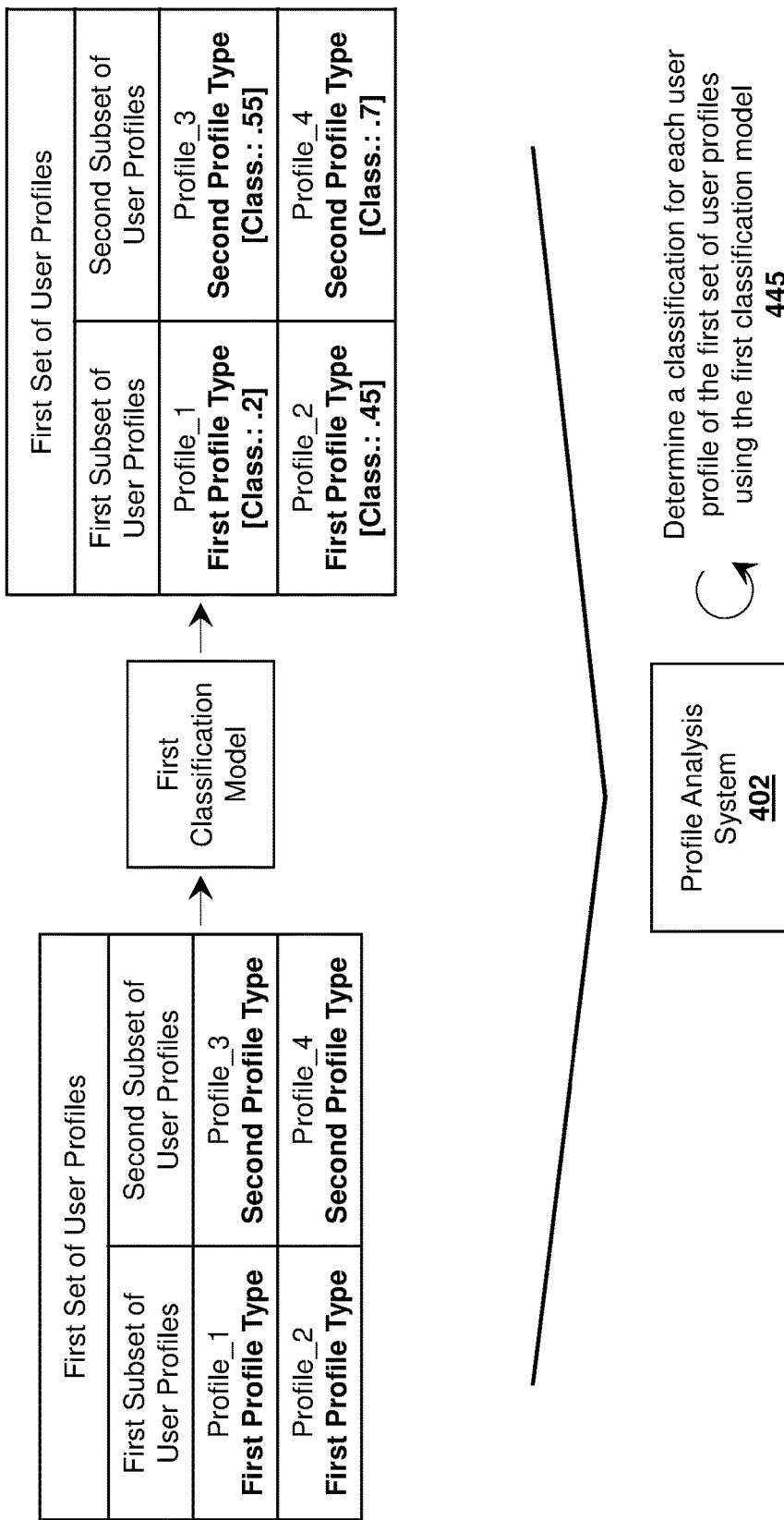

US 12,008,449 B2

SYSTEM, METHOD, AND COMPUTER PROGRAM PRODUCT FOR ITERATIVELY REFINING A TRAINING DATA SET

CROSS REFERENCE TO RELATED APPLICATIONS

This application is a continuation application of U.S. patent application Ser. No. 17/953,488, filed Sep. 27, 2022, which is a continuation application of U.S. patent application Ser. No. 16/844,346, filed Apr. 9, 2020, now issued as U.S. Pat. No. 11,488,065 on Nov. 1, 2022, the disclosures of which are hereby incorporated by reference in their entirety.

BACKGROUND

1. Field

This disclosure relates generally to iteratively refining a training data set and, in some non-limiting embodiments or aspects, to systems, methods, and computer program products for iteratively refining a training data set for training a classification model.

2. Technical Considerations

A predictive model may be used to identify a profile type of a user profile. For example, a predictive model may be trained using a set of user profiles that are associated with one or more profile types to configure the predictive model to identify a profile type of a user profile provided as input to the predictive model. Each user profile of the set of user profiles may be associated with (e.g., include) one or more activities (e.g., payment transactions) involving users associated with the user profiles. For example, the set of user profiles used to train the predictive model may include user profiles of all the same type (e.g., profiles including payment transactions involving a business, a consumer, and/or the like). Once trained, the predictive model may be used to generate predictions (e.g., classifications) indicating whether a user profile is associated with one or more profile types.

However, one or more user profiles included in the set of user profiles used to train the predictive model may include activities that cause the predictive model to generate inaccurate predictions. For example, one or more user profiles included in the set of user profiles used to train the predictive model may include activities that are not associated with the profile type of the user profile (e.g., a consumer profile may include purchases of diesel fuel, the purchase of diesel fuel being a purchase associated with a business profile). In such an example, predictions generated by the predictive model may be less accurate when one or more user profiles included in the set of user profiles used to train the predictive model may include activities that are not associated with the profile type of the user profile. Additionally or alternatively, systems implementing and/or associated with such systems may rely on larger sets of user profiles to effectively train the predictive models (e.g., to negate the effects of the one or more user profiles included in the set of user profiles used to train the predictive model that may include activities that are not associated with the profile type of the user profile) and, in turn, may require additional computational resources to train the predictive models.

SUMMARY

Accordingly, disclosed are systems, methods, and computer program products for iteratively refining a training data set.

According to some non-limiting embodiments or aspects, provided is a method for iteratively refining a training data set, the method including: training, with at least one processor, a first predictive model based on a first set of user profiles, the first set of user profiles comprising: a first subset of user profiles associated with a first profile type, and a second subset of user profiles associated with a second profile type; determining, with at least one processor, a classification for each user profile of a second set of user profiles using the first predictive model, the classification indicating whether each user profile of the second set of user profiles is associated with the first profile type or the second profile type, the second set of user profiles comprising: a third subset of user profiles associated with the first profile type, and a fourth subset of user profiles associated with the second profile type; determining, with at least one processor, a performance score for the first predictive model based on the classification of each user profile of the second set of user profiles, the performance score indicating accuracy of the first predictive model when classifying each user profile of the second set of user profiles; determining, with at least one processor, whether to update the first predictive model based on the performance score for the first predictive model; determining, with at least one processor, a classification for each user profile of the first set of user profiles using the first predictive model based on determining to update the first predictive model; and selecting, with at least one processor, at least one user profile of the first subset of user profiles or at least one user profile of the second subset of user profiles to include in a removal set of user profiles based on the classification for each user profile of the first set of user profiles.

According to some non-limiting embodiments or aspects, provided is a system for iteratively refining a training data set, the system including: at least one processor programmed and/or configured to: train a first predictive model based on a first set of user profiles, the first set of user profiles comprising: a first subset of user profiles associated with a first profile type, and a second subset of user profiles associated with a second profile type; determine a classification for each user profile of a second set of user profiles using the first predictive model, the classification indicating whether each user profile of the second set of user profiles is associated with the first profile type or the second profile type, the second set of user profiles comprising: a third subset of user profiles associated with the first profile type, and a fourth subset of user profiles associated with the second profile type; determine a performance score for the first predictive model based on the classification of each user profile of the second set of user profiles, the performance score for the first predictive model indicating accuracy of the first predictive model when classifying each user profile of the second set of user profiles; determine whether to update the first predictive model based on the performance score for the first predictive model; determine a classification for each user profile of the first set of user profiles using the first predictive model based on determining to update the first predictive model; select at least one user profile of the first subset of user profiles or at least one user profile of the second subset of user profiles to include in a removal set of user profiles based on the classification for each user profile of the first set of user profiles; and remove each user profile included in the removal set of user profiles from the first set of user profiles.

According to some non-limiting embodiments or aspects, provided is a computer program product for iteratively refining a training data set, the computer program product including: at least one non-transitory computer-readable medium including one or more instructions that, when executed by at least one processor, cause the at least one processor to: train a first predictive model based on a first set of user profiles, the first set of user profiles comprising: a first subset of user profiles associated with a first profile type, and a second subset of user profiles associated with a second profile type; determine a classification for each user profile of a second set of user profiles using the first predictive model, the classification indicating whether each user profile of the second set of user profiles is associated with the first profile type or the second profile type, the second set of user profiles comprising: a third subset of user profiles associated with the first profile type, and a fourth subset of user profiles associated with the second profile type; determine a performance score for the first predictive model based on the classification of each user profile of the second set of user profiles, the performance score for the first predictive model indicating accuracy of the first predictive model when classifying each user profile of the second set of user profiles; determine whether to update the first predictive model based on the performance score for the first predictive model and a performance score of a previous predictive model; determine a classification for each user profile of the first set of user profiles using the first predictive model based on determining to update the first predictive model; and select at least one user profile of the first subset of user profiles or at least one user profile of the second subset of user profiles to include in a removal set of user profiles based on the classification for each user profile of the first set of user profiles.

Further non-limiting aspects or embodiments are set forth in the following numbered clauses:

Clause 1: A method, comprising: training, with at least one processor, a first predictive model based on a first set of user profiles, the first set of user profiles comprising: a first subset of user profiles associated with a first profile type, and a second subset of user profiles associated with a second profile type; determining, with at least one processor, a classification for each user profile of a second set of user profiles using the first predictive model, the classification indicating whether each user profile of the second set of user profiles is associated with the first profile type or the second profile type, the second set of user profiles comprising: a third subset of user profiles associated with the first profile type, and a fourth subset of user profiles associated with the second profile type; determining, with at least one processor, a performance score for the first predictive model based on the classification of each user profile of the second set of user profiles, the performance score indicating accuracy of the first predictive model when classifying each user profile of the second set of user profiles; determining, with at least one processor, whether to update the first predictive model based on the performance score for the first predictive model; determining, with at least one processor, a classification for each user profile of the first set of user profiles using the first predictive model based on determining to update the first predictive model; and selecting, with at least one processor, at least one user profile of the first subset of user profiles or at least one user profile of the second subset of user profiles to include in a removal set of user profiles based on the classification for each user profile of the first set of user profiles.

Clause 2: The method of clause 1, further comprising: removing each user profile included in the removal set of user profiles from the first set of user profiles; training a second predictive model based on the first set of user profiles and based on removing each user profile included in the removal set of user profiles from the first set of user profiles; determining a classification indicating whether each user profile of the second set of user profiles is associated with the first profile type or the second profile type using the second predictive model; determining a performance score for the second predictive model based on the classification of each user profile of the second set of user profiles determined using the second predictive model, the performance score indicating accuracy of the second predictive model when classifying each user profile of the second set of user profiles; and determining whether the performance score for the second predictive model satisfies a performance score threshold for the first predictive model.

Clause 3: The method of clauses 1 or 2, further comprising: receiving, from an issuer system, data associated with a third set of user profiles, the third set of user profiles comprising: a fifth subset of user profiles associated with the first profile type, and a sixth subset of user profiles associated with the second profile type; determining a classification indicating whether each user profile of the third set of user profiles is associated with the first profile type or the second profile type using the first predictive model based on determining that the performance score for the second predictive model satisfies the performance score threshold for the first predictive model; and transmitting data associated with the classification of each user profile of the third set of user profiles to the issuer system.

Clause 4: The method of any of clauses 1-3, wherein determining whether to update the first predictive model based on the performance score for the first predictive model comprises: comparing the performance score for the first predictive model to a performance score of a previous predictive model, wherein the previous predictive model was trained based on a previous set of user profiles, the previous set of user profiles comprising: the first subset of user profiles, the second subset of user profiles, and at least one additional user profile that was removed from the first subset of user profiles or the second subset of user profiles based on a classification for the at least one additional user profile, wherein the classification for the at least one additional user profile is determined using the previous predictive model, determining that the performance score for the first predictive model satisfies a performance score threshold based on comparing the performance score for the first predictive model to the performance score of the previous predictive model; determining that the performance score for the first predictive model satisfies the performance score threshold; and determining to update the first predictive model based on determining that the performance score for the first predictive model satisfies the performance score threshold.

Clause 5: The method of any of clauses 1-4, wherein selecting the at least one user profile of the first subset of user profiles or the at least one user profile of the second subset of user profiles to include in the removal set of user profiles based on the classification for each user profile of the first set of user profiles comprises: comparing the classification for each user profile of the first subset of user profiles to a first removal threshold; determining that one or more user profiles of the first subset of user profiles satisfies the first removal threshold based on comparing the classification for each user profile of the first subset of user profiles to the first removal threshold; and including the one or more user profiles of the first subset of user profiles in the removal set of user profiles based on determining that the one or more user profiles of the first subset of user profiles satisfies the first removal threshold.

Clause 6: The method of any of clauses 1-5, wherein selecting the at least one user profile of the first subset of user profiles or the at least one user profile of the second subset of user profiles to include in the removal set of user profiles based on the classification for each user profile of the first set of user profiles comprises: comparing the classification for each user profile of the second subset of user profiles to a second removal threshold; determining that one or more user profiles of the second subset of user profiles satisfies the second removal threshold based on comparing the classification for each user profile of the second subset of user profiles to the second removal threshold; and including the one or more user profiles of the second subset of user profiles in the removal set of user profiles based on determining that the one or more user profiles of the second subset of user profiles satisfies the second removal threshold.

Clause 7: The method of any of clauses 1-6, wherein the first profile type is a consumer profile type, and wherein the second profile type is a business profile type, the method further comprising: transferring at least one user profile from the first subset of user profiles to the second subset of user profiles; determining whether the first set of user profiles comprises the at least one user profile that was transferred from the first subset of user profiles to the second subset of user profiles based on determining to forgo updating the first predictive model based on the performance score for the first predictive model; and determining to update the first predictive model based on determining that the first set of user profiles comprises the at least one user profile that was transferred from the first subset of user profiles to the second subset of user profiles.

Clause 8: A system, comprising: at least one processor programmed or configured to: train a first predictive model based on a first set of user profiles, the first set of user profiles comprising: a first subset of user profiles associated with a first profile type, and a second subset of user profiles associated with a second profile type; determine a classification for each user profile of a second set of user profiles using the first predictive model, the classification indicating whether each user profile of the second set of user profiles is associated with the first profile type or the second profile type, the second set of user profiles comprising: a third subset of user profiles associated with the first profile type, and a fourth subset of user profiles associated with the second profile type; determine a performance score for the first predictive model based on the classification of each user profile of the second set of user profiles, the performance score for the first predictive model indicating accuracy of the first predictive model when classifying each user profile of the second set of user profiles; determine whether to update the first predictive model based on the performance score for the first predictive model; determine a classification for each user profile of the first set of user profiles using the first predictive model based on determining to update the first predictive model; select at least one user profile of the first subset of user profiles or at least one user profile of the second subset of user profiles to include in a removal set of user profiles based on the classification for each user profile of the first set of user profiles; and remove each user profile included in the removal set of user profiles from the first set of user profiles.

Clause 9: The system of clause 8, wherein the at least one processor is further programmed or configured to: train a second predictive model based on the first set of user profiles and based on removing each user profile included in the removal set of user profiles from the first set of user profiles; determine a classification indicating whether each user profile of the second set of user profiles is associated with the first profile type or the second profile type using the second predictive model; determine a performance score for the second predictive model based on the classification of each user profile of the second set of user profiles determined using the second predictive model, the performance score for the second predictive model indicating accuracy of the second predictive model when classifying each user profile of the second set of user profiles; and determine whether the performance score for the second predictive model satisfies a performance score threshold for the first predictive model.

Clause 10: The system of clauses 8 or 9, wherein the at least one processor is further programmed or configured to: receive, from an issuer system, data associated with a third set of user profiles, the third set of user profiles comprising: a fifth subset of user profiles associated with the first profile type, and a sixth subset of user profiles associated with the second profile type; determine a classification indicating whether each user profile of the third set of user profiles is associated with the first profile type or the second profile type using the first predictive model based on determining that the performance score for the second predictive model satisfies the performance score threshold for the first predictive model; and transmit data associated with the classification of each user profile of the third set of user profiles to the issuer system.

Clause 11: The system of any of clauses 8-10, wherein, when determining whether to update the first predictive model based on the performance score for the first predictive model, the at least one processor is programmed or configured to: compare the performance score for the first predictive model to a performance score of a previous predictive model, wherein the previous predictive model was trained based on a previous set of user profiles, the previous set of user profiles comprising: the first subset of user profiles, the second subset of user profiles, and at least one additional user profile that was removed from the first subset of user profiles or the second subset of user profiles based on a classification for the at least one additional user profile, wherein the classification for the at least one additional user profile is determined using the previous predictive model, determine that the performance score for the first predictive model satisfies a performance score threshold based on comparing the performance score for the first predictive model to the performance score of the previous predictive model; determine that the performance score for the first predictive model satisfies the performance score threshold; and determine whether to update the first predictive model based on determining that the performance score for the first predictive model satisfies the performance score threshold.

Clause 12: The system of any of clauses 8-11, wherein, when selecting the at least one user profile of the first subset of user profiles or the at least one user profile of the second subset of user profiles to include in the removal set of user profiles based on the classification for each user profile of the first set of user profiles, the at least one processor is programmed or configured to: compare the classification for each user profile of the first subset of user profiles to a first removal threshold; determine that one or more user profiles of the first subset of user profiles satisfies the first removal threshold based on comparing the classification for each user profile of the first subset of user profiles to the first removal threshold; and include the one or more user profiles of the first subset of user profiles in the removal set of user profiles based on determining that the one or more user profiles of the first subset of user profiles satisfies the first removal threshold.

Clause 13: The system of any of clauses 8-12, wherein, when selecting the at least one user profile of the first subset of user profiles or the at least one user profile of the second subset of user profiles to include in the removal set of user profiles based on the classification for each user profile of the first set of user profiles, the at least one processor is programmed or configured to: compare the classification for each user profile of the second subset of user profiles to a second removal threshold; determine that one or more user profiles of the second subset of user profiles satisfies the second removal threshold based on comparing the classification for each user profile of the second subset of user profiles to the second removal threshold; and include the one or more user profiles of the second subset of user profiles in the removal set of user profiles based on determining that the one or more user profiles of the second subset of user profiles satisfies the second removal threshold.

Clause 14: The system of any of clauses 8-13, wherein the first profile type is a consumer profile type, and wherein the second profile type is a business profile type, and wherein the at least one processor is further programmed or configured to: transfer at least one user profile from the first subset of user profiles to the second subset of user profiles; determine that the first set of user profiles comprises the at least one user profile that was transferred from the first subset of user profiles to the second subset of user profiles based on determining to forgo updating the first predictive model based on the performance score for the first predictive model; and determine whether to update the first predictive model based on determining that the first set of user profiles comprises the at least one user profile that was transferred from the first subset of user profiles to the second subset of user profiles.

Clause 15: A computer program product comprising at least one non-transitory computer-readable medium including one or more instructions that, when executed by at least one processor, cause the at least one processor to: train a first predictive model based on a first set of user profiles, the first set of user profiles comprising: a first subset of user profiles associated with a first profile type, and a second subset of user profiles associated with a second profile type; determine a classification for each user profile of a second set of user profiles using the first predictive model, the classification indicating whether each user profile of the second set of user profiles is associated with the first profile type or the second profile type, the second set of user profiles comprising: a third subset of user profiles associated with the first profile type, and a fourth subset of user profiles associated with the second profile type; determine a performance score for the first predictive model based on the classification of each user profile of the second set of user profiles, the performance score for the first predictive model indicating accuracy of the first predictive model when classifying each user profile of the second set of user profiles; determine whether to update the first predictive model based on the performance score for the first predictive model and a performance score of a previous predictive model; determine a classification for each user profile of the first set of user profiles using the first predictive model based on determining to update the first predictive model; and select at least one user profile of the first subset of user profiles or at least one user profile of the second subset of user profiles to include in a removal set of user profiles based on the classification for each user profile of the first set of user profiles.

Clause 16: The computer program product of clause 15, wherein the one or more instructions further cause the at least one processor to: remove each user profile included in the removal set of user profiles from the first set of user profiles; train a second predictive model based on the first set of user profiles and based on removing each user profile included in the removal set of user profiles from the first set of user profiles; determine a classification indicating whether each user profile of the second set of user profiles is associated with the first profile type or the second profile type using the second predictive model; determine a performance score for the second predictive model based on the classification of each user profile of the second set of user profiles determined using the second predictive model, the performance score for the second predictive model indicating accuracy of the second predictive model when classifying each user profile of the second set of user profiles; and determine whether the performance score for the second predictive model satisfies a performance score threshold for the first predictive model.

Clause 17: The computer program product of clauses 15 or 16, wherein the one or more instructions further cause the at least one processor to: receive, from an issuer system, data associated with a third set of user profiles, the third set of user profiles comprising: a fifth subset of user profiles associated with the first profile type, and a sixth subset of user profiles associated with the second profile type; determine a classification indicating whether each user profile of the third set of user profiles is associated with the first profile type or the second profile type using the first predictive model based on determining that the performance score for the second predictive model satisfies the performance score threshold for the first predictive model; and transmit data associated with the classification of each user profile of the third set of user profiles to the issuer system.

Clause 18: The computer program product of any of clauses 15-17, wherein the one or more instructions that cause the at least one processor to determine whether to update the first predictive model based on the performance score for the first predictive model cause the at least one processor to: compare the performance score for the first predictive model to a performance score of the previous predictive model, wherein the previous predictive model was trained based on a previous set of user profiles, the previous set of user profiles comprising: the first subset of user profiles, the second subset of user profiles, and at least one additional user profile that was removed from the first subset of user profiles or the second subset of user profiles based on a classification for the at least one additional user profile, wherein the classification for the at least one additional user profile is determined using the previous predictive model, determine that the performance score for the first predictive model satisfies a performance score threshold based on comparing the performance score for the first predictive model to the performance score of the previous predictive model; determine that the performance score for the first predictive model satisfies the performance score threshold; and determine whether to update the first predictive model based on determining that the performance score for the first predictive model satisfies the performance score threshold.

Clause 19: The computer program product of any of clauses 15-18, wherein the one or more instructions that cause the at least one processor to select the at least one user profile of the first subset of user profiles or the at least one user profile of the second subset of user profiles to include in the removal set of user profiles based on the classification for each user profile of the first set of user profiles, cause the at least one processor to: compare the classification for each user profile of the first subset of user profiles to a first removal threshold; determine that one or more user profiles of the first subset of user profiles satisfies the first removal threshold based on comparing the classification for each user profile of the first subset of user profiles to the first removal threshold; and include the one or more user profiles of the first subset of user profiles in the removal set of user profiles based on determining that the one or more user profiles of the first subset of user profiles satisfies the first removal threshold.

Clause 20: The computer program product of any of clauses 15-19, wherein the one or more instructions that cause the at least one processor to select the at least one user profile of the first subset of user profiles or the at least one user profile of the second subset of user profiles to include in the removal set of user profiles based on the classification for each user profile of the first set of user profiles cause the at least one processor to: compare the classification for each user profile of the second subset of user profiles to a second removal threshold; determine that one or more user profiles of the second subset of user profiles satisfies the second removal threshold based on comparing the classification for each user profile of the second subset of user profiles to the second removal threshold; and include the one or more user profiles of the second subset of user profiles in the removal set of user profiles based on determining that the one or more user profiles of the second subset of user profiles satisfies the second removal threshold.

These and other features and characteristics of the present disclosure, as well as the methods of operation and functions of the related elements of structures and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the present disclosure. As used in the specification and the claims, the singular form of "a," "an," and "the" include plural referents unless the context clearly dictates otherwise.

BRIEF DESCRIPTION OF THE DRAWINGS

FIGS. 4A-4I are diagrams of an implementation of a non-limiting aspect or embodiment of a process for iteratively refining a training data set.

DESCRIPTION

Figure 1:
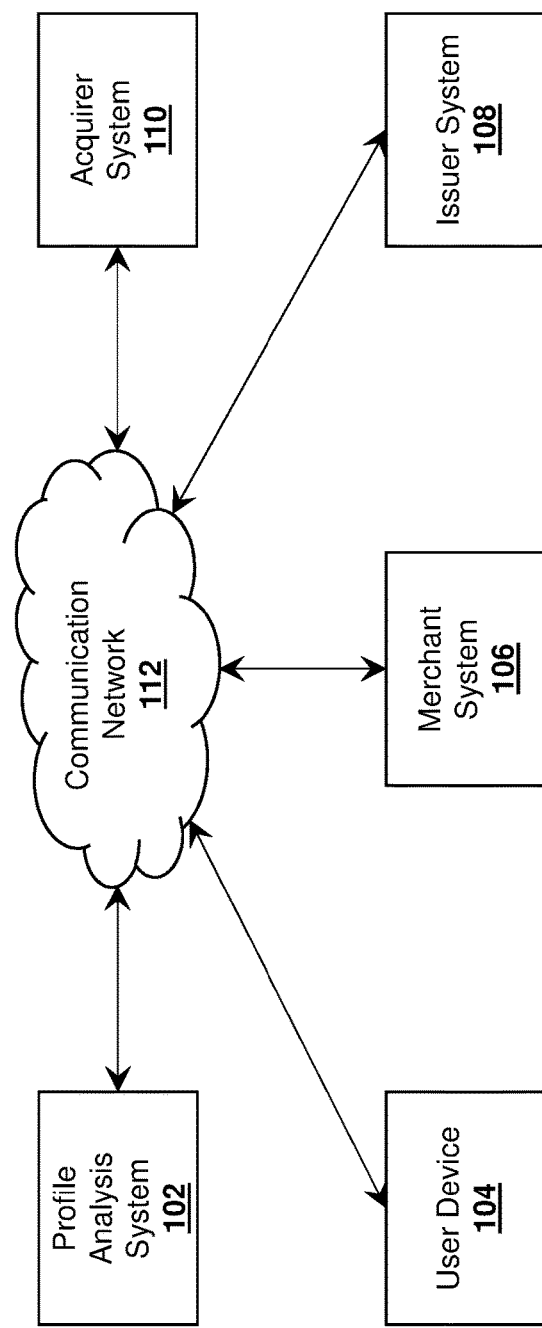
FIG. 1 is a diagram of a non-limiting aspect or embodiment of a system for iteratively refining a training data set.

For purposes of the description hereinafter, the terms "end," "upper," "lower," "right," "left," "vertical," "horizontal," "top," "bottom," "lateral," "longitudinal," and derivatives thereof shall relate to the disclosure as it is oriented in the drawing figures. However, it is to be understood that the disclosure may assume various alternative variations and step sequences, except where expressly specified to the contrary. It is also to be understood that the specific devices and processes illustrated in the attached drawings, and described in the following specification, are simply exemplary embodiments or aspects of the disclosure. Hence, specific dimensions and other physical characteristics related to the embodiments or aspects of the embodiments disclosed herein are not to be considered as limiting unless otherwise indicated.

No aspect, component, element, structure, act, step, function, instruction, and/or the like used herein should be construed as critical or essential unless explicitly described as such. In addition, as used herein, the articles "a" and "an" are intended to include one or more items and may be used interchangeably with "one or more" and "at least one." Furthermore, as used herein, the term "set" is intended to include one or more items (e.g., related items, unrelated items, a combination of related and unrelated items, etc.) and may be used interchangeably with "one or more" or "at least one." Where only one item is intended, the term "one" or similar language is used. Also, as used herein, the terms "has," "have," "having," or the like are intended to be open-ended terms. Further, the phrase "based on" is intended to mean "based at least partially on" unless explicitly stated otherwise.

As used herein, the terms "communication" and "communicate" may refer to the reception, receipt, transmission, transfer, provision, and/or the like of information (e.g., data, signals, messages, instructions, commands, and/or the like). For one unit (e.g., a device, a system, a component of a device or system, combinations thereof, and/or the like) to be in communication with another unit means that the one unit is able to directly or indirectly receive information from and/or send (e.g., transmit) information to the other unit. This may refer to a direct or indirect connection that is wired and/or wireless in nature. Additionally, two units may be in communication with each other even though the information transmitted may be modified, processed, relayed, and/or routed between the first and second unit. For example, a first unit may be in communication with a second unit even though the first unit passively receives information and does not actively transmit information to the second unit. As another example, a first unit may be in communication with a second unit if at least one intermediary unit (e.g., a third unit located between the first unit and the second unit) processes information received from the first unit and transmits the processed information to the second unit. In some non-limiting embodiments or aspects, a message may refer to a network packet (e.g., a data packet and/or the like) that includes data.

As used herein, the terms "issuer," "issuer institution," "issuer bank," or "payment device issuer," may refer to one or more entities that provide accounts to individuals (e.g., users, consumers, and/or the like) for conducting payment transactions, such as credit payment transactions and/or debit payment transactions. For example, an issuer institution may provide an account identifier, such as a primary account number (PAN), to a consumer that uniquely identifies one or more accounts associated with that consumer. In some non-limiting embodiments or aspects, an issuer may be associated with a bank identification number (BIN) that uniquely identifies the issuer institution. As used herein "issuer system" may refer to one or more computer systems operated by or on behalf of an issuer, such as a server executing one or more software applications. For example, an issuer system may include one or more authorization servers for authorizing a transaction.

As used herein, the term "account identifier" may refer to one or more types of identifiers associated with an account (e.g., a PAN associated with an account, a card number associated with an account, a payment card number associated with an account, a token associated with an account, and/or the like). In some non-limiting embodiments or aspects, an issuer may provide an account identifier (e.g., a PAN, a token, and/or the like) to a user (e.g., an accountholder) that uniquely identifies one or more accounts associated with that user. The account identifier may be embodied on a payment device (e.g., a physical instrument used for conducting payment transactions, such as a payment card, a credit card, a debit card, a gift card, and/or the like) and/or may be electronic information communicated to the user that the user may use for electronic payment transactions. In some non-limiting embodiments or aspects, the account identifier may be an original account identifier, where the original account identifier was provided to a user at the creation of the account associated with the account identifier. In some non-limiting embodiments or aspects, the account identifier may be a supplemental account identifier, which may include an account identifier that is provided to a user after the original account identifier was provided to the user. For example, if the original account identifier is forgotten, stolen, and/or the like, a supplemental account identifier may be provided to the user. In some non-limiting embodiments or aspects, an account identifier may be directly or indirectly associated with an issuer institution such that an account identifier may be a token that maps to a PAN or other type of account identifier. Account identifiers may be alphanumeric, any combination of characters and/or symbols, and/or the like.

As used herein, the term "token" may refer to an account identifier that is used as a substitute or replacement for another account identifier, such as a PAN. Tokens may be associated with a PAN or other original account identifier in one or more data structures (e.g., one or more databases and/or the like) such that they may be used to conduct a payment transaction without directly using the original account identifier. In some non-limiting embodiments or aspects, an original account identifier, such as a PAN, may be associated with a plurality of tokens for different individuals or purposes. In some non-limiting embodiments or aspects, tokens may be associated with a PAN or other account identifiers in one or more data structures such that they can be used to conduct a transaction without directly using the PAN or the other account identifiers. In some examples, an account identifier, such as a PAN, may be associated with a plurality of tokens for different uses or different purposes.

As used herein, the term "merchant" may refer to one or more entities (e.g., operators of retail businesses) that provide goods and/or services, and/or access to goods and/or services, to a user (e.g., a consumer, and/or the like) based on a transaction, such as a payment transaction. As used herein "merchant system" may refer to one or more computer systems operated by or on behalf of a merchant, such as a server executing one or more software applications. As used herein, the term "product" may refer to one or more goods and/or services offered by a merchant.

As used herein, a "point-of-sale (POS) device" may refer to one or more devices, which may be used by a merchant to conduct a transaction (e.g., a payment transaction) and/or process a transaction. For example, a POS device may include one or more client devices. Additionally or alternatively, a POS device may include peripheral devices, card readers, scanning devices (e.g., code scanners), Bluetooth® communication receivers, near-field communication (NFC) receivers, radio frequency identification (RFID) receivers, and/or other contactless transceivers or receivers, contact-based receivers, payment terminals, and/or the like.

As used herein, a "point-of-sale (POS) system" may refer to one or more client devices and/or peripheral devices used by a merchant to conduct a transaction. For example, a POS system may include one or more POS devices and/or other like devices that may be used to conduct a payment transaction. In some non-limiting embodiments or aspects, a POS system (e.g., a merchant POS system) may include one or more server computers programmed or configured to process online payment transactions through webpages, mobile applications, and/or the like.

As used herein, the term "transaction service provider" may refer to an entity that receives transaction authorization requests from merchants or other entities and provides guarantees of payment, in some cases through an agreement between the transaction service provider and an issuer institution. For example, a transaction service provider may include a payment network such as Visa®, MasterCard®, American Express®, or any other entity that processes transactions. As used herein "transaction service provider system" may refer to one or more computer systems operated by or on behalf of a transaction service provider, such as a transaction service provider system executing one or more software applications. A transaction service provider system may include one or more processors and, in some non-limiting embodiments or aspects, may be operated by or on behalf of a transaction service provider.

As used herein, the term "acquirer" may refer to an entity licensed by the transaction service provider and approved by the transaction service provider to originate transactions (e.g., payment transactions) involving a payment device associated with the transaction service provider. As used herein, the term "acquirer system" may also refer to one or more computer systems, computer devices, and/or the like operated by or on behalf of an acquirer. The transactions the acquirer may originate may include payment transactions (e.g., purchases, original credit transactions (OCTs), account funding transactions (AFTs), and/or the like). In some non-limiting embodiments or aspects, the acquirer may be authorized by the transaction service provider to assign merchant or service providers to originate transactions involving a payment device associated with the transaction service provider. The acquirer may contract with payment facilitators to enable the payment facilitators to sponsor merchants. The acquirer may monitor compliance of the payment facilitators in accordance with regulations of the transaction service provider. The acquirer may conduct due diligence of the payment facilitators and ensure proper due diligence occurs before signing a sponsored merchant. The acquirer may be liable for all transaction service provider programs that the acquirer operates or sponsors. The acquirer may be responsible for the acts of the acquirer's payment facilitators, merchants that are sponsored by the acquirer's payment facilitators, and/or the like. In some non-limiting embodiments or aspects, an acquirer may be a financial institution, such as a bank.

As used herein, the term "payment gateway" may refer to an entity and/or a payment processing system operated by or on behalf of such an entity (e.g., a merchant service provider, a payment service provider, a payment facilitator, a payment facilitator that contracts with an acquirer, a payment aggregator, and/or the like), which provides payment services (e.g., transaction service provider payment services, payment processing services, and/or the like) to one or more merchants. The payment services may be associated with the use of portable financial devices managed by a transaction service provider. As used herein, the term "payment gateway system" may refer to one or more computer systems, computer devices, servers, groups of servers, and/or the like operated by or on behalf of a payment gateway.

As used herein, the terms "electronic wallet," "electronic wallet mobile application," and "digital wallet" may refer to one or more electronic devices including one or more software applications configured to facilitate and/or conduct transactions (e.g., payment transactions, electronic payment transactions, and/or the like). For example, an electronic wallet may include a user device (e.g., a mobile device) executing an application program, server-side software, and/or databases for maintaining and providing data to be used during a payment transaction to the user device. As used herein, the term "electronic wallet provider" may include an entity that provides and/or maintains an electronic wallet and/or an electronic wallet mobile application for a user (e.g., a consumer). Examples of an electronic wallet provider include, but are not limited to, Google Pay®, Android Pay®, Apple Pay®, and Samsung Pay®. In some non-limiting examples, a financial institution (e.g., an issuer institution) may be an electronic wallet provider. As used herein, the term "electronic wallet provider system" may refer to one or more computer systems, computer devices, servers, groups of servers, and/or the like operated by or on behalf of an electronic wallet provider.

As used herein, the term "payment device" may refer to a payment card (e.g., a credit or debit card), a gift card, a smartcard, smart media, a payroll card, a healthcare card, a wristband, a machine-readable medium containing account information, a keychain device or fob, an RFID transponder, a retailer discount or loyalty card, and/or the like. The payment device may include a volatile or a non-volatile memory to store information (e.g., an account identifier, a name of the account holder, and/or the like).

As used herein, the terms "client" and "client device" may refer to one or more computing devices, such as processors, storage devices, and/or similar computer components, that access a service made available by a server. In some non-limiting embodiments or aspects, a "client device" may refer to one or more devices that facilitate payment transactions, such as POS devices and/or POS systems used by a merchant. In some non-limiting embodiments or aspects, a client device may include an electronic device configured to communicate with one or more networks and/or facilitate payment transactions such as, but not limited to, one or more desktop computers, one or more portable computers (e.g., tablet computers), one or more mobile devices (e.g., cellular phones, smartphones, PDAs (e.g., personal digital assistant), wearable devices, such as watches, glasses, lenses, and/or clothing, and/or the like), and/or other like devices. Moreover, a "client" may also refer to an entity, such as a merchant, that owns, utilizes, and/or operates a client device for facilitating payment transactions with a transaction service provider.

As used herein, the term "server" may refer to one or more computing devices, such as processors, storage devices, and/or similar computer components that communicate with client devices and/or other computing devices over a network, such as the Internet or private networks and, in some examples, facilitate communication among other servers and/or client devices.

As used herein, the term "system" may refer to one or more computing devices or combinations of computing devices such as, but not limited to, processors, servers, client devices, software applications, and/or other like components. In addition, reference to "a server" or "a processor," as used herein, may refer to a previously-recited server and/or processor that is recited as performing a previous step or function, a different server and/or processor, and/or a combination of servers and/or processors. For example, as used in the specification and the claims, a first server and/or a first processor that is recited as performing a first step or function may refer to the same or different server and/or a processor recited as performing a second step or function.

Provided are improved systems, methods, and computer program products for iteratively refining a training data set. In some non-limiting embodiments or aspects, systems, methods, and computer program products may include training, with at least one processor, a first predictive model based on a first set of user profiles, the first set of user profiles comprising: a first subset of user profiles associated with a first profile type, and a second subset of user profiles associated with a second profile type; determining, with at least one processor, a classification for each user profile of a second set of user profiles using the first predictive model, the classification indicating whether each user profile of the second set of user profiles is associated with the first profile type or the second profile type, the second set of user profiles comprising: a third subset of user profiles associated with the first profile type, and a fourth subset of user profiles associated with the second profile type; determining, with at least one processor, a performance score for the first predictive model based on the classification of each user profile of the second set of user profiles, the performance score indicating accuracy of the first predictive model when classifying each user profile of the second set of user profiles; determining, with at least one processor, whether to update the first predictive model based on the performance score for the first predictive model; determining, with at least one processor, a classification for each user profile of the first set of user profiles using the first predictive model based on determining to update the first predictive model; and selecting, with at least one processor, at least one user profile of the first subset of user profiles or at least one user profile of the second subset of user profiles to include in a removal set of user profiles based on the classification for each user profile of the first set of user profiles.

By virtue of implementation of the systems, methods, and computer program products described herein, one or more user profiles included in the set of user profiles used to train the predictive model that include activities that cause the predictive model to generate inaccurate predictions may be removed, and the predictive model retrained. For example, one or more user profiles included in the set of user profiles used to train the predictive model that include activities that are not associated with the profile type of the user profile may be selected and removed from the set of user profiles used to train the predictive model. In such an example, predictions generated by the predictive model may be more accurate. Additionally or alternatively, systems implementing and/or associated with such systems may rely on smaller sets of user profiles to effectively train the predictive models and, in turn, may reduce the amount of computational resources used to train the predictive models.

Referring now to FIG. 1, FIG. 1 is a diagram of an example environment 100 in which devices, systems, methods, and/or products described herein may be implemented. As shown in FIG. 1, environment 100 includes profile analysis system 102, user device 104, merchant system 106, issuer system 108, acquirer system 110, and/or communication network 112. Profile analysis system 102, user device 104, merchant system 106, issuer system 108, acquirer system 110, and/or communication network 112 may interconnect (e.g., establish a connection to communicate, and/or the like) via wired connections, wireless connections, or a combination of wired and wireless connections.

Profile analysis system 102 may include one or more devices configured to be in communication with user device 104, merchant system 106, and/or issuer system 108 via communication network 112. For example, profile analysis system 102 may include a server, a group of servers, and/or the like. In some non-limiting embodiments or aspects, profile analysis system 102 may be associated with a transaction service provider and/or a payment gateway as described herein.

User device 104 may include one or more devices configured to be in communication with profile analysis system 102, merchant system 106, and/or issuer system 108 via communication network 112. For example, user device 104 may include a payment device, a smartphone, a laptop computer, a desktop computer, and/or the like. User device 104 may be configured to transmit and/or receive data to and/or from merchant system 106 via an imaging system and/or a short-range wireless communication connection (e.g., an NFC communication connection, an RFID communication connection, a Bluetooth® communication connection, and/or the like). In some non-limiting embodiments or aspects, user device 104 may be associated with a user as described herein.

Merchant system 106 may include one or more devices configured to be in communication with profile analysis system 102, user device 104, and/or issuer system 108 via communication network 112. For example, merchant system 106 may include one or more computing devices such as a server, a group of servers, a client device, a group of client devices, and/or the like. In some non-limiting embodiments or aspects, merchant system 106 may include a point-of-sale (POS) device. In some non-limiting embodiments or aspects, merchant system 106 may be associated with a merchant as described herein.

Issuer system 108 may include one or more devices configured to be in communication with profile analysis system 102, user device 104, and/or merchant system 106 via communication network 112. For example, issuer system 108 may include a server, a group of servers, and/or the like. In some non-limiting embodiments or aspects, issuer system 108 may be associated with an issuer institution that issued a payment account and/or instrument (e.g., a credit account, a debit account, a credit card, a debit card, and/or the like) to a user (e.g., a user associated with user device 104 and/or the like).

Acquirer system 110 may include one or more devices configured to be in communication with profile analysis system 102, user device 104, merchant system 106, and/or issuer system 108 via communication network 112. For example, acquirer system 110 may include a server, a group of servers, and/or the like. In some non-limiting embodiments or aspects, acquirer system 110 may be associated with an acquirer as described herein.

Communication network 112 may include one or more wired and/or wireless networks. For example, communication network 112 may include a cellular network (e.g., a long-term evolution (LTE) network, a third generation (3G) network, a fourth generation (4G) network, a code division multiple access (CDMA) network, etc.), a public land mobile network (PLMN), a local area network (LAN), a wide area network (WAN), a metropolitan area network (MAN), a telephone network (e.g., the public switched telephone network (PSTN)), a private network, an ad hoc network, an intranet, the Internet, a fiber optic-based network, a cloud computing network, and/or the like, and/or a combination of some or all of these or other types of networks.

The number and arrangement of systems and/or devices shown in FIG. 1 are provided as an example. There may be additional systems and/or devices, fewer systems and/or devices, different systems and/or devices, or differently arranged systems and/or devices than those shown in FIG. 1. Furthermore, two or more systems and/or devices shown in FIG. 1 may be implemented within a single system or a single device, or a single system or a single device shown in FIG. 1 may be implemented as multiple, distributed systems or devices. Additionally or alternatively, a set of systems or a set of devices (e.g., one or more systems, one or more devices) of environment 100 may perform one or more functions described as being performed by another set of systems or another set of devices of environment 100.

Figure 2:
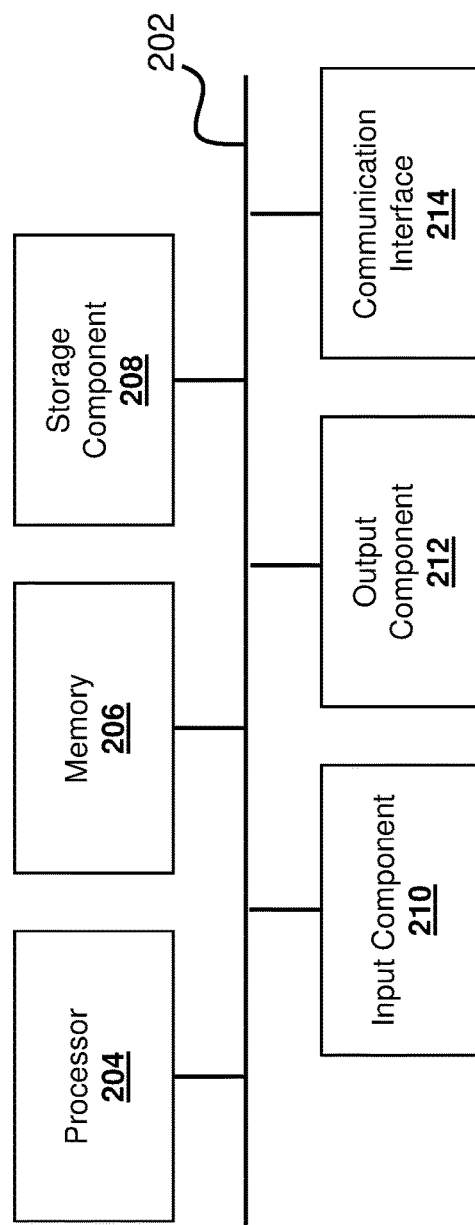
FIG. 2 is a diagram of a non-limiting aspect or embodiment of components of one or more devices and/or one or more systems of FIG. 1.

Referring now to FIG. 2, illustrated is a diagram of example components of device 200. Device 200 may correspond to one or more devices of profile analysis system 102 (e.g., one or more devices of a system of profile analysis system 102), one or more devices of user device 104 (e.g., one or more devices of a system of user device 104), one or more devices of merchant system 106 (e.g., one or more devices of a system of a system of merchant system 106), one or more devices of issuer system 108 (e.g., one or more devices of a system of a system of issuer system 108), and/or one or more devices of communication network 112 (e.g., one or more devices of a system of a system of communication network 112). In some non-limiting embodiments or aspects, one or more devices of profile analysis system 102, one or more devices of user device 104, one or more devices of merchant system 106, one or more devices of issuer system 108, and/or one or more devices of communication network 112 may include at least one device 200 and/or at least one component of device 200. As shown in FIG. 2, device 200 may include bus 202, processor 204, memory 206, storage component 208, input component 210, output component 212, and communication interface 214.

Bus 202 may include a component that permits communication among the components of device 200. In some non-limiting embodiments or aspects, processor 204 may be implemented in hardware, software, or a combination of hardware and software. For example, processor 204 may include a processor (e.g., a central processing unit (CPU), a graphics processing unit (GPU), an accelerated processing unit (APU), etc.), a microprocessor, a digital signal processor (DSP), and/or any processing component (e.g., a field-programmable gate array (FPGA), an application-specific integrated circuit (ASIC), etc.) that can be programmed to perform a function. Memory 206 may include random access memory (RAM), read-only memory (ROM), and/or another type of dynamic or static storage device (e.g., flash memory, magnetic memory, optical memory, etc.) that stores information and/or instructions for use by processor 204.

Storage component 208 may store information and/or software related to the operation and use of device 200. For example, storage component 208 may include a hard disk (e.g., a magnetic disk, an optical disk, a magneto-optic disk, a solid state disk, etc.), a compact disc (CD), a digital versatile disc (DVD), a floppy disk, a cartridge, a magnetic tape, and/or another type of computer-readable medium, along with a corresponding drive.

Input component 210 may include a component that permits device 200 to receive information, such as via user input (e.g., a touchscreen display, a keyboard, a keypad, a mouse, a button, a switch, a microphone, a camera, etc.). Additionally or alternatively, input component 210 may include a sensor for sensing information (e.g., a global positioning system (GPS) component, an accelerometer, a gyroscope, an actuator, etc.). Output component 212 may include a component that provides output information from device 200 (e.g., a display, a speaker, one or more light-emitting diodes (LEDs), etc.).

Communication interface 214 may include a transceiver-like component (e.g., a transceiver, a separate receiver and transmitter, etc.) that enables device 200 to communicate with other devices, such as via a wired connection, a wireless connection, or a combination of wired and wireless connections. Communication interface 214 may permit device 200 to receive information from another device and/or provide information to another device. For example, communication interface 214 may include an Ethernet interface, an optical interface, a coaxial interface, an infrared interface, a radio frequency (RF) interface, a universal serial bus (USB) interface, a WiFi® interface, a cellular network interface, and/or the like.

Device 200 may perform one or more processes described herein. Device 200 may perform these processes based on processor 204 executing software instructions stored by a computer-readable medium, such as memory 206 and/or storage component 208. A computer-readable medium (e.g., a non-transitory computer-readable medium) is defined herein as a non-transitory memory device. A non-transitory memory device includes memory space located inside of a single physical storage device or memory space spread across multiple physical storage devices.

Software instructions may be read into memory 206 and/or storage component 208 from another computer-readable medium or from another device via communication interface 214. When executed, software instructions stored in memory 206 and/or storage component 208 may cause processor 204 to perform one or more processes described herein. Additionally or alternatively, hardwired circuitry may be used in place of or in combination with software instructions to perform one or more processes described herein. Thus, embodiments or aspects described herein are not limited to any specific combination of hardware circuitry and software.

Memory 206 and/or storage component 208 may include data storage or one or more data structures (e.g., a database, and/or the like). Device 200 may be capable of receiving information from, storing information in, communicating information to, or searching information stored in the data storage or one or more data structures in memory 206 and/or storage component 208. For example, the information may include data associated with a set of profiles, input data, output data, transaction data, account data, or any combination thereof.

The number and arrangement of components shown in FIG. 2 are provided as an example. In some non-limiting embodiments or aspects, device 200 may include additional components, fewer components, different components, or differently arranged components than those shown in FIG. 2. Additionally or alternatively, a set of components (e.g., one or more components) of device 200 may perform one or more functions described as being performed by another set of components of device 200.

Figure 3:
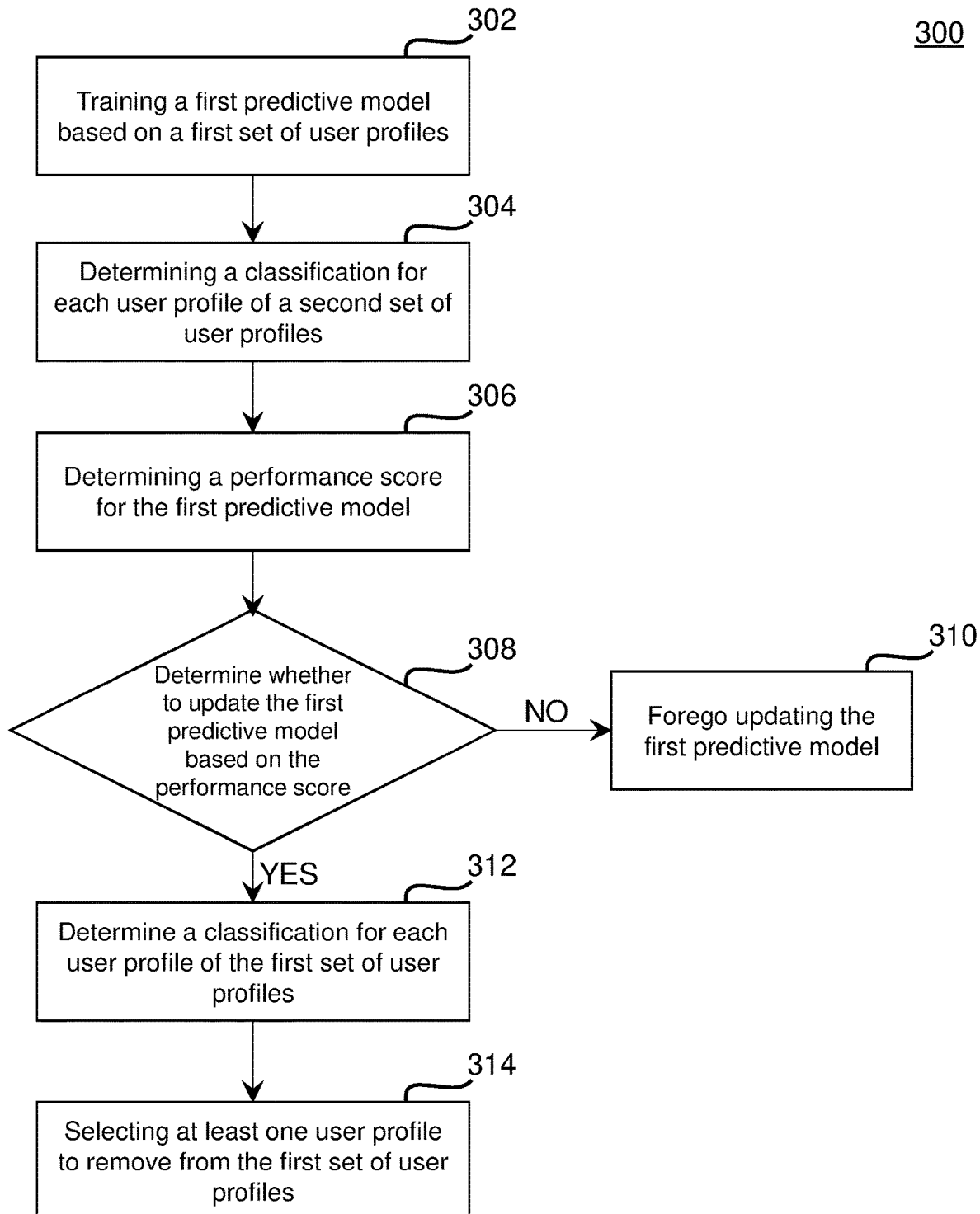
FIG. 3 is a flowchart of a non-limiting aspect or embodiment of a process for iteratively refining a training data set.

Referring now to FIG. 3, illustrated is a flowchart of a non-limiting aspect or embodiment of a process 300 for iteratively refining a training data set. In some non-limiting embodiments or aspects, one or more of the functions described with respect to process 300 may be performed (e.g., completely, partially, etc.) by profile analysis system 102. In some non-limiting embodiments or aspects, one or more of the steps of process 300 may be performed (e.g., completely, partially, and/or the like) by another device or a group of devices separate from and/or including profile analysis system 102, such as user device 104, merchant system 106, and/or issuer system 108.

As shown in FIG. 3, at step 302, process 300 may include training a first predictive model based on a first set of user profiles. For example, profile analysis system 102 may train a first predictive model based on a first set of user profiles. In such an example, profile analysis system 102 may provide one or more user profiles of the first set of user profiles to the first predictive model to train the first predictive model. In some non-limiting embodiments or aspects, the first set of user profiles may include one or more user profiles as described herein.

In some non-limiting embodiments or aspects, the first set of user profiles may include one or more user profiles (e.g., profiles including payment transactions associated with a user). For example, the first set of user profiles may include one or more user profiles, each user profile associated with a profile type. In some non-limiting embodiments or aspects, a profile type may include a consumer profile type (e.g., a profile type associated with a payment account involved in one or more payment transactions that include at least one consumer), a business profile type (e.g., a profile type associated with a payment account involved in one or more payment transactions that include at least one business), and/or the like. In some non-limiting embodiments or aspects, the first set of user profiles may include a first subset of user profiles and a second subset of user profiles. For example, the first set of user profiles may include a first subset of user profiles that are associated with a first profile type and a second subset of user profiles that are associated with second profile type. In such an example, the first profile type may be different from the second profile type.

In some non-limiting embodiments or aspects, the first predictive model may be a model that is configured to generate a prediction indicating a profile type of a user profile. For example, the first predictive model may be a classification model (e.g., a model associated with logistic regression, a model associated with a decision tree, a model associated with a random forest, a model associated with a gradient-boosted tree, and/or the like) configured to receive data associated with a user profile and generate a prediction indicating the profile type of the user profile. In some non-limiting embodiments or aspects, a prediction generated by the first predictive model may include a classification (e.g., a binary value such as 0 or 1, a range of values such as values from 0-1, and/or the like) indicating a likelihood that a user profile is associated with one or more profile types. For example, a classification may include a value (e.g., 0.3) that indicates a user profile is 30% likely to be associated with a first profile type (e.g., a consumer profile type) and, by extension, is 70% likely to be associated with a second profile type (e.g., a business profile type).

As shown in FIG. 3, at step 304, process 300 may include determining a classification for each user profile of a second set of user profiles. For example, profile analysis system 102 may determine a classification for each user profile of a second set of user profiles. In some non-limiting embodiments or aspects, the second set of user profiles may include one or more user profiles that are the same as, or different from, one or more user profiles of the first set of user profiles. For example, the second set of user profiles may include one or more user profiles, each user profile associated with a profile type. In some non-limiting embodiments or aspects, the second set of user profiles may include a third subset of user profiles and a fourth subset of user profiles. For example, the second set of user profiles may include a third subset of user profiles that are associated with the first profile type and a fourth subset of user profiles that are associated with the second profile type. In such an example, the first profile type may be different from the second profile type.

In some non-limiting embodiments or aspects, profile analysis system 102 may determine a classification for each user profile of the second set of user profiles based on (e.g., using) the first predictive model. For example, profile analysis system 102 may provide data associated with each user profile of the second set of user profiles as input to the first predictive model. In such an example, profile analysis system 102 may generate an output including a prediction based on providing the data associated with each user profile of the second set of user profiles to the first predictive model. The prediction included in the output associated with the data associated with each user profile provided as input to the first predictive model may include a classification indicating whether the user profile is associated with the first profile type and/or the second profile type.

As shown in FIG. 3, at step 306, process 300 may include determining a performance score for the first predictive model. For example, profile analysis system 102 may determine a performance score for the first predictive model. In some non-limiting embodiments or aspects, profile analysis system 102 may determine a performance score for the first predictive model based on the classification of each user profile of the second set of user profiles. In some non-limiting embodiments or aspects, the performance score may indicate accuracy of the first predictive model when classifying each user profile of the second set of user profiles. For example, the performance score may include a value (e.g., a binary value such as 0 or 1, a range of values such as values from 0-1, and/or the like) representing the accuracy of the first predictive model when classifying each user profile of the second set of user profiles. In some non-limiting embodiments or aspects, profile analysis system 102 may determine the performance score for the first predictive model based on profile analysis system 102 comparing the classification of each user profile of the second set of user profiles to a pre-established classification of each user profile of the second set of user profiles.

As shown in FIG. 3, at step 308, process 300 may include determining whether to update the first predictive model based on the performance score. For example, profile analysis system 102 may determine whether to update the first predictive model based on the performance score. In such an example, profile analysis system 102 may determine whether to update the first predictive model based on the performance score for the first predictive model.

In some non-limiting embodiments or aspects, profile analysis system 102 may determine whether to update the first predictive model based on the performance score for the first predictive model and a performance score of a previous predictive model. For example, profile analysis system 102 may determine whether to update the first predictive model based on profile analysis system comparing the performance score for the first predictive model to a performance score of a previous predictive model. In such an example, profile analysis system 102 may determine the performance score for the previous predictive model based on (e.g., prior to) profile analysis system 102 determining the performance score for the first predictive model.

In some non-limiting embodiments or aspects, the previous predictive model may be a model that is the same as or similar to the first predictive model. For example, the previous predictive model may be a predictive model that profile analysis system 102 trained based on a previous set of user profiles. In some non-limiting embodiments or aspects, the previous set of user profiles used to train the previous predictive model may include the first subset of user profiles, the second subset of user profiles, and at least one additional user profile that was removed from either the first subset of user profiles or the second subset of user profiles. In some non-limiting embodiments or aspects, the at least one additional user profile that was removed from either the first subset of user profiles or the second subset of user profiles may be a user profile that is associated with a profile type (e.g., a profile type associated with the user profiles of the first subset of user profiles or a profile type associated with the user profiles of the second subset of user profiles).

In some non-limiting embodiments or aspects, the previous predictive model may be a model that is configured to generate a prediction indicating a profile type of a user profile. For example, the previous predictive model may be a classification model configured to receive data associated with a user profile and generate a prediction indicating the profile type of the user profile. In some non-limiting embodiments or aspects, a prediction generated by the first predictive model may include a classification (e.g., a binary value such as 0 or 1, a range of values such as values from 0-1, and/or the like) indicating a likelihood that a user profile is associated with one or more profile types.

In some non-limiting embodiments or aspects, the performance score of the previous predictive model may indicate accuracy of the previous predictive model when classifying each user profile of the previous set of user profiles. For example, the performance score may include a value (e.g., a binary value such as 0 or 1, a range of values such as values from 0-1, and/or the like) representing the accuracy of the previous predictive model when classifying each user profile of the previous set of user profiles. In some non-limiting embodiments or aspects, the performance score for the previous predictive model may be determined based on a classification of each user profile of the previous set of user profiles. For example, profile analysis system 102 may determine the performance score for the previous predictive model based on the classification of each user profile of the previous set of user profiles. In such an example, profile analysis system 102 may determine the performance score for the previous predictive model based on profile analysis system 102 determining a classification for each user profile of the previous set of user profiles and profile analysis system 102 comparing the classification of each user profile of the previous set of user profiles to a pre-established classification of each user profile of the previous set of user profiles. In some non-limiting embodiments or aspects, profile analysis system 102 may determine the classification for each user profile of the previous set of user profiles using the previous predictive model in a manner similar to profile analysis system 102 determining the classification for each user profile of the first set of user profiles as described herein.

In some non-limiting embodiments or aspects, profile analysis system 102 may determine whether the performance score for the first predictive model satisfies a performance score threshold. For example, profile analysis system 102 may determine whether the performance score for the first predictive model satisfies a performance score threshold based on profile analysis system 102 determining that a deviation between the performance score for the first predictive model and the performance score for the previous predictive model satisfies the performance score threshold. In such an example, the performance score threshold may be a performance score of a predictive model that was trained before the first predictive model (e.g., the previous predictive model), a predetermined value associated with an improvement in the accuracy of a predictive model in classifying user profiles of a set of user profiles when compared to the accuracy of the previous predictive model, a predetermined value associated with accuracy of a predictive model that is acceptable to one or more users as described herein, and/or the like. In some non-limiting embodiments or aspects, profile analysis system 102 may determine to update the first predictive model based on profile analysis system 102 determining that the performance score for the first predictive model satisfies the performance score threshold. Additionally or alternatively, profile analysis system 102 may determine to forego updating the first predictive model based on profile analysis system 102 determining that the performance score for the first predictive model does not satisfy the performance score threshold.

As shown in FIG. 3, at step 310 ("NO" at step 308), process 300 may include foregoing updating the first predictive model. For example, profile analysis system 102 may forego updating the first predictive model. In some non-limiting embodiments or aspects, profile analysis system 102 may forego updating the first predictive model based on the performance score for the first predictive model. For example, profile analysis system 102 may forego updating the first predictive model based on profile analysis system 102 determining that the performance score for the first predictive model does not satisfy the performance score threshold. In some non-limiting embodiments or aspects, profile analysis system 102 may determine that the first predictive model is less accurate at determining a profile type than the previous predictive model based on profile analysis system 102 determining that the performance score for the first predictive model does not satisfy the performance score threshold.

As shown in FIG. 3, at step 312 ("YES" at step 308), process 300 may include determining a classification for each user profile of the first set of user profiles. For example, profile analysis system 102 may determine a classification for each user profile of the first set of user profiles. In some non-limiting embodiments or aspects, profile analysis system 102 may determine a classification for each user profile of the first set of user profiles based on profile analysis system 102 determining to update the first predictive model.

In some non-limiting embodiments or aspects, profile analysis system 102 may determine a classification for each user profile of the second set of user profiles based on (e.g., using) the first predictive model. For example, profile analysis system 102 may provide data associated with each user profile of the first set of user profiles as input to the first predictive model. In such an example, profile analysis system 102 may generate an output including a prediction based on providing the data associated with each user profile of the first set of user profiles to the first predictive model. The prediction included in the output associated with the data associated with each user profile provided as input to the first predictive model may include a classification indicating whether the user profile is associated with the first profile type and/or the second profile type.

As shown in FIG. 3, at step 314, process 300 may include selecting at least one user profile to remove from the first set of user profiles. For example, profile analysis system 102 may select at least one user profile to remove from the first set of user profiles. In some non-limiting embodiments or aspects, profile analysis system 102 may select at least one user profile to include in a removal set of user profiles (e.g., a set of profiles to be removed from a set of profiles such as, for example, the first set of user profiles). For example, profile analysis system 102 may select at least one user profile to include in a removal set of user profiles based on profile analysis system 102 selecting the at least one user profile to remove from the first set of user profiles. In some non-limiting embodiments or aspects, profile analysis system 102 may select the at least one user profile to include in the removal set of user profiles based on the classification for each user profile of the first set of user profiles.

In some non-limiting embodiments or aspects, profile analysis system 102 may select the at least one user profile to include in the removal set of user profiles where the at least one user profile includes one or more user profiles of the first subset of user profiles and/or one or more user profiles of the second subset of user profiles. For example, profile analysis system 102 may select the at least one user profile to include in the removal set of user profiles based on comparing the classification for each user profile of the first subset of user profiles to a first removal threshold. Additionally or alternatively, profile analysis system 102 may select the at least one user profile to include in the removal set of user profiles based on comparing the classification for each user profile of the second subset of user profiles to a second removal threshold. In some non-limiting embodiments or aspects, the first removal threshold may be associated with the first profile type. For example, the first removal threshold may include a range of classifications that may be different from, included partially in, or included completely in a range of classifications associated with the first profile type. Additionally or alternatively, the second removal threshold may be associated with the second profile type. For example, the second removal threshold may include a range of classifications that may be different from, included partially in, or included completely in a range of classifications associated with the second profile type.

In some non-limiting embodiments or aspects, profile analysis system 102 may determine that one or more user profiles of the first subset of user profiles satisfies the first removal threshold. For example, profile analysis system 102 may determine that one or more user profiles of the first subset of user profiles satisfies the first removal threshold based on profile analysis system 102 comparing the classification for each user profile of the first subset of user profiles to the first removal threshold. Additionally or alternatively, profile analysis system 102 may determine that one or more user profiles of the second subset of user profiles satisfies the second removal threshold based on profile analysis system 102 comparing the classification for each user profile of the second subset of user profiles to the second removal threshold. In some non-limiting embodiments or aspects, profile analysis system 102 may include one or more user profiles in the removal set of user profiles. For example, profile analysis system 102 may include one or more user profiles in the removal set of user profiles based on profile analysis system 102 determining that one or more user profiles of the first subset of user profiles satisfies the first removal threshold and/or one or more user profiles of the second subset of user profiles satisfies the second removal threshold.

In some non-limiting embodiments or aspects, profile analysis system 102 may remove each user profile included in the removal set of user profiles from the first set of user profiles. For example, profile analysis system 102 may remove each user profile included in the removal set of user profiles from the first set of user profiles based on profile analysis system 102 determining that one or more user profiles of the first subset of user profiles satisfies the first removal threshold and/or that one or more user profiles of the second subset of user profiles satisfies the second removal threshold.

In some non-limiting embodiments or aspects, profile analysis system 102 may train a second predictive model. For example, profile analysis system 102 may train a second predictive model based on the first set of user profiles and based on removing each user profile included in the removal set of user profiles from the first set of user profiles. In some non-limiting embodiments or aspects, profile analysis system 102 may train the second predictive model in a manner similar to profile analysis system 102 training the first predictive model. For example, profile analysis system 102 may provide one or more user profiles of the first set of user profiles to the second predictive model to train the second predictive model, the first set of user profiles not including the one or more user profiles that were included in the removal set of user profiles.

In some non-limiting embodiments or aspects, profile analysis system 102 may determine a classification for each user profile of the second set of user profiles. For example, profile analysis system 102 may determine a classification for each user profile of the second set of user profiles using the second predictive model. In such an example, profile analysis system 102 may provide data associated with each user profile of the second set of user profiles as input to the second predictive model. In some non-limiting embodiments or aspects, profile analysis system 102 may generate an output including a prediction based on providing the data associated with each user profile of the second set of user profiles to the second predictive model. The prediction included in the output associated with the data associated with each user profile provided as input to the second predictive model may include a classification indicating whether the user profile is associated with the first profile type and/or the second profile type.

In some non-limiting embodiments or aspects, profile analysis system 102 may determine a performance score for the second predictive model. In some non-limiting embodiments or aspects, profile analysis system 102 may determine a performance score for the second predictive model based on the classification of each user profile of the second set of user profiles. In some non-limiting embodiments or aspects, the performance score may indicate accuracy of the second predictive model when classifying each user profile of the second set of user profiles. For example, the performance score may include a value (e.g., a binary value such as 0 or 1, a range of values such as values from 0-1, and/or the like) representing the accuracy of the second predictive model when classifying each user profile of the second set of user profiles. In some non-limiting embodiments or aspects, profile analysis system 102 may determine the performance score for the second predictive model based on profile analysis system 102 comparing the classification of each user profile of the second set of user profiles to the pre-established classification of each user profile of the second set of user profiles.

In some non-limiting embodiments or aspects, profile analysis system 102 may determine whether the performance score for the second predictive model satisfies the performance score threshold. For example, profile analysis system 102 may determine whether the performance score for the first predictive model satisfies the performance score threshold based on profile analysis system 102 determining that a deviation between the performance score for the second predictive model and the performance score for the first predictive model satisfies the performance score threshold. In some non-limiting embodiments or aspects, profile analysis system 102 may determine to update the second predictive model based on profile analysis system 102 determining that the performance score for the second predictive model satisfies the performance score threshold. Additionally or alternatively, profile analysis system 102 may determine to forego updating the second predictive model based on profile analysis system 102 determining that the performance score for the second predictive model does not satisfy the performance score threshold.

In some non-limiting embodiments or aspects, profile analysis system 102 may receive data associated with a third set of user profiles. For example, profile analysis system 102 may receive data associated with a third set of user profiles from issuer system 108. In such an example, the third set of user profiles may include one or more user profiles, as described herein. In some non-limiting embodiments or aspects, the third set of user profiles may include a fifth subset of user profiles and a sixth subset of user profiles. For example, the third set of user profiles may include a fifth subset of user profiles associated with the first profile type and a sixth subset of user profiles associated with the second profile type.

In some non-limiting embodiments or aspects, profile analysis system 102 may determine a classification for each user profile of the third set of user profiles. For example, profile analysis system 102 may determine a classification for each user profile of the third set of user profiles. In such an example, profile analysis system 102 may determine the classification for each profile of the third set of user profiles based on (e.g., using) the first predictive model and/or the second predictive model. In some non-limiting embodiments or aspects, profile analysis system 102 may determine the classification for each profile of the third set of user profiles using the first predictive model and/or the second predictive model based on profile analysis system 102 determining whether the performance score of the second predictive model satisfies the performance score threshold. In some non-limiting embodiments or aspects, profile analysis system 102 may transmit data associated with the classification of each user profile of the third set of user profiles. For example, profile analysis system 102 may transmit data associated with the classification of each user profile of the third set of user profiles to issuer system 108. In such an example, profile analysis system 102 may transmit the data associated with the classification of each user profile of the third set of user profiles to issuer system 108 based on profile analysis system 102 receiving the data associated with a third set of user profiles from issuer system 108.

In some non-limiting embodiments or aspects, profile analysis system 102 may transfer at least one user profile from the first subset of user profiles to the second subset of user profiles. For example, profile analysis system 102 may transfer at least one user profile from the first subset of user profiles to the second subset of user profiles based on (e.g., before) profile analysis system 102 determining whether to update the first predictive model. Additionally or alternatively, profile analysis system 102 may transfer at least one user profile from the second subset of user profiles to the first subset of user profiles. For example, profile analysis system 102 may transfer at least one user profile from the second subset of user profiles to the first subset of user profiles based on (e.g., before and/or after) profile analysis system 102 determining whether to update the first predictive model based on the performance score of the first predictive model. In some non-limiting embodiments or aspects, profile analysis system 102 may determine whether the first set of user profiles includes the at least one user profiles that was transferred from the first subset of user profiles to the second subset of user profiles (or vice versa). For example, profile analysis system 102 may determine whether the first set of user profiles includes the at least one user profile that was transferred from the first subset of user profiles to the second subset of user profiles based on (e.g., after) profile analysis system 102 determining whether to update the first predictive model. In such an example, profile analysis system 102 may determine to update the first predictive model based on determining that the first set of user profiles comprises the at least one user profile that was transferred from the first subset of user profiles to the second subset of user profiles. Additionally or alternatively, profile analysis system 102 may determine to forego updating the first predictive model based on determining that the first set of user profiles comprises the at least one user profile that was transferred from the first subset of user profiles to the second subset of user profiles.

Referring now to FIGS. 4A-4I, FIGS. 4A-4I are flowcharts of a non-limiting embodiment or aspect of an implementation 400 relating to a process for iteratively refining a training data set. As illustrated in FIGS. 4A-4I, implementation 400 may include profile analysis system 402 and/or issuer system 408. In some non-limiting embodiments or aspects, profile analysis system 402 may be the same as or similar to profile analysis system 102. In some non-limiting embodiments or aspects, issuer system 408 may be the same as or similar to issuer system 108.

Figure 4A:
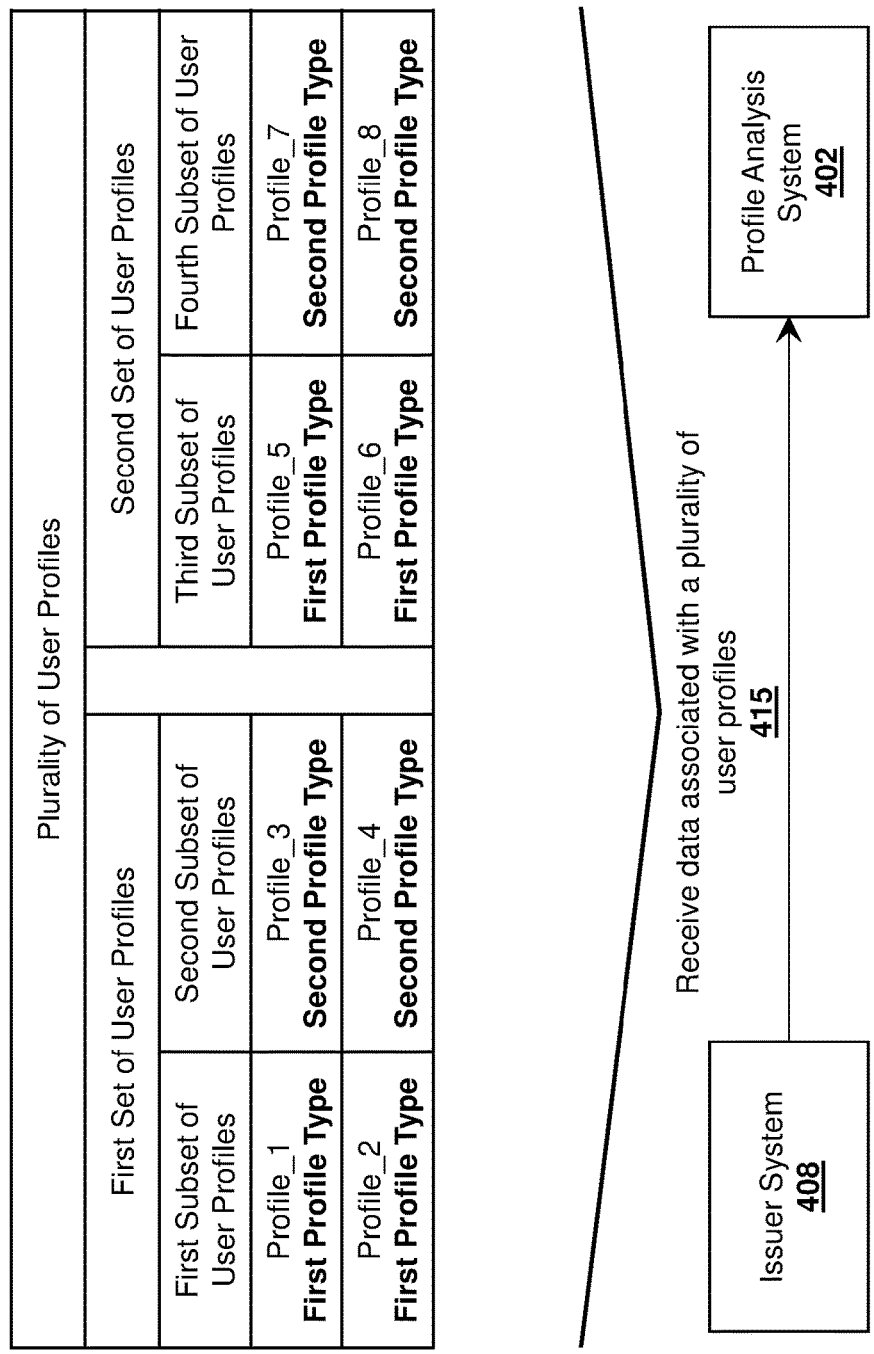

As shown by reference number 415 in FIG. 4A, profile analysis system 402 may receive data associated with a plurality of user profiles. For example, profile analysis system 402 may receive data associated with a plurality of user profiles from issuer system 408. The plurality of user profiles may include a first set of user profiles (e.g., a training dataset) and a second set of user profiles (e.g., a testing dataset). The first set of user profiles may include a first subset of user profiles and a second subset of user profiles. The second set of user profiles may include a third subset of user profiles and a fourth subset of user profiles. In some non-limiting embodiments or aspects, the first subset of user profiles and the third subset of user profiles may be associated with a first profile type (e.g., a consumer profile type), and the second subset of user profiles and the fourth subset of user profiles may be associated with a second profile type (e.g., a business profile type). Each user profile may include payment transactions associated with a user. For example, a user profile associated with a consumer profile type may include one or more transactions involving (e.g., initiated by) a consumer. Additionally or alternatively, a user profile associated with a business profile type may include one or more payment transactions involving (e.g., initiated by) a business (e.g., an agent of a business, and/or the like).

Figure 4B:
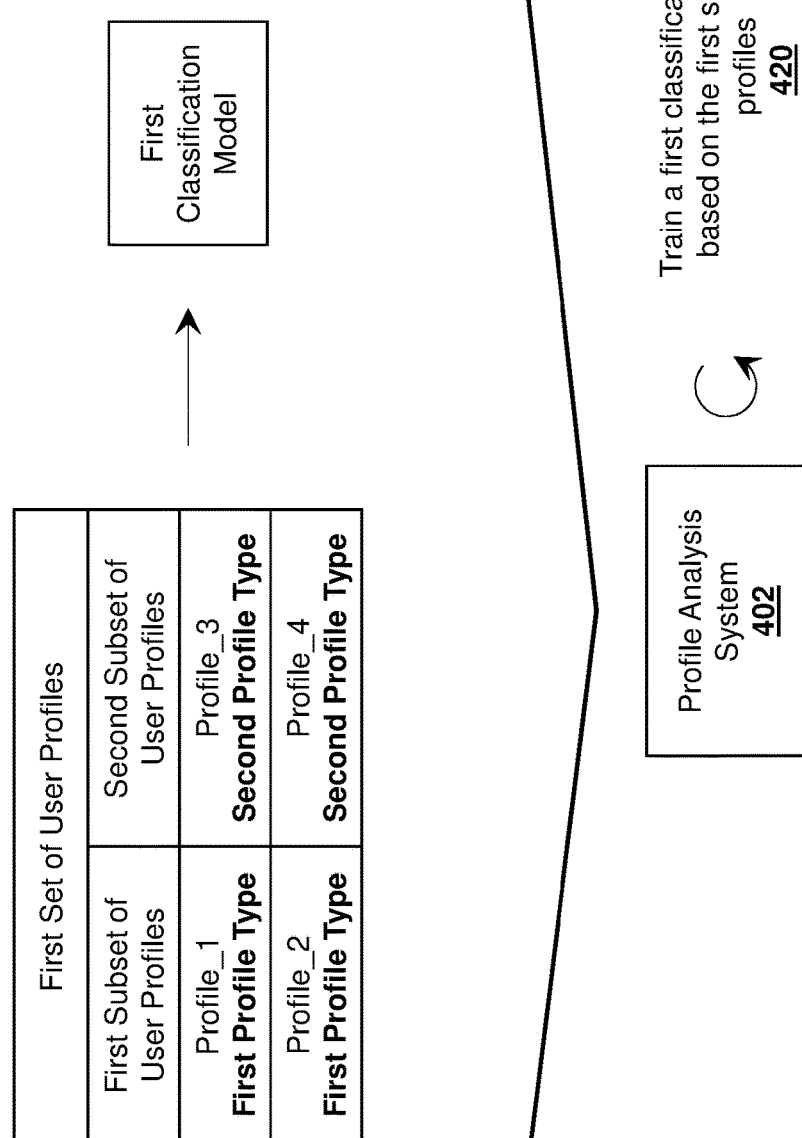

As shown by reference number 420 in FIG. 4B, profile analysis system 402 may train a first classification model based on the first set of user profiles. For example, profile analysis system 402 may train a first classification model based on the first set of user profiles.

Figure 4C:
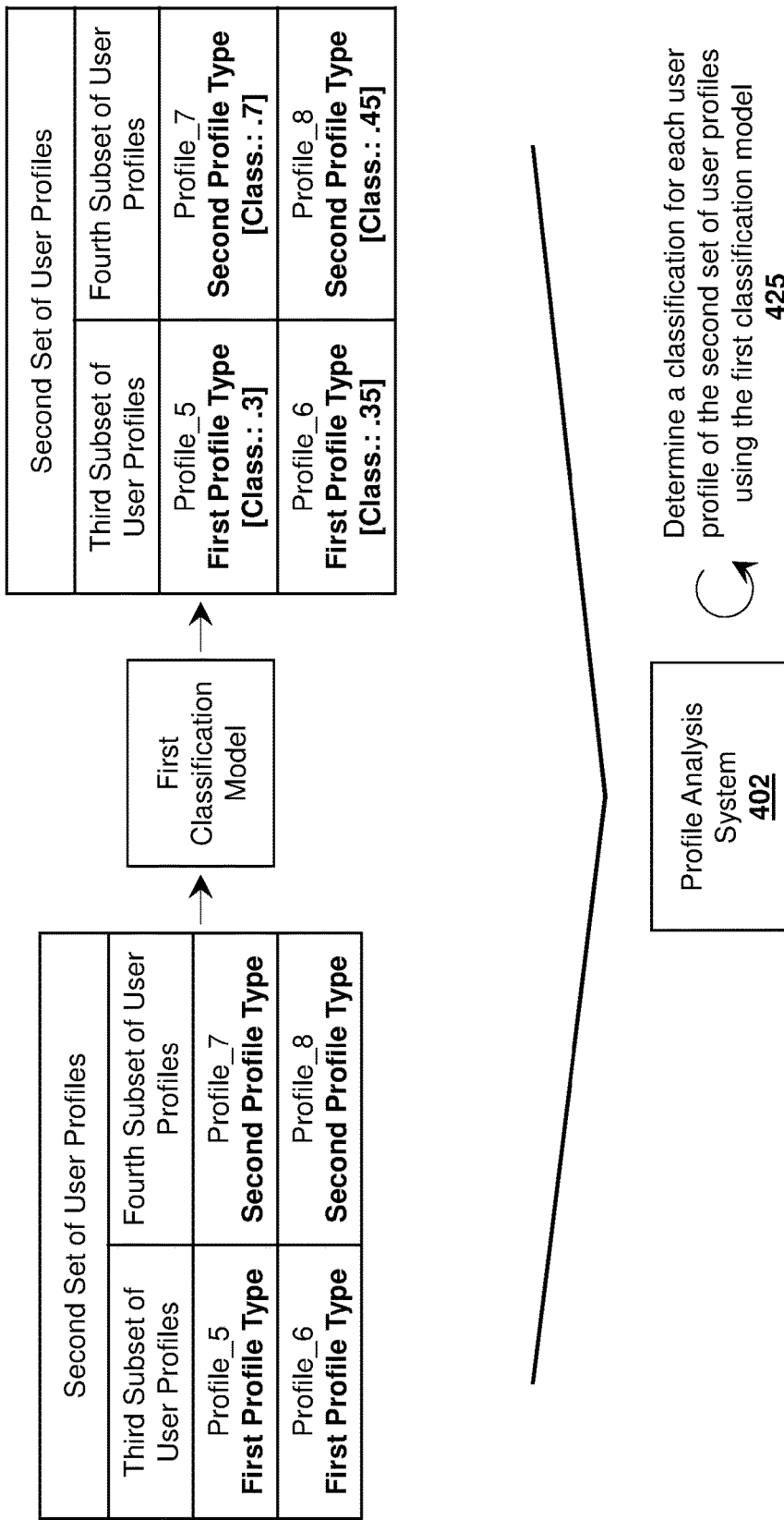

As shown by reference number 425 in FIG. 4C, profile analysis system 402 may determine a classification for each user profile of the second set of user profiles using the first classification model. For example, profile analysis system 402 may determine a classification (e.g., a value such as 0.3, 0.35, 0.7, 0.45) for each user profile (e.g., Profile_5, Profile_6, Profile_7, Profile_8) of the second set of user profiles. In such an example, profile analysis system 402 may provide data associated with each user profile of the second set of user profiles as input to the first classification model and profile analysis system 402 may generate one or more outputs including the classifications for each user profile of the second set of user profiles. The classifications may represent an indication of a likelihood that a user profile is associated with the second profile type (e.g., a percentage representing the likelihood that each profile is associated with a business profile type).

As shown by reference number 430 in FIG. 4D, profile analysis system 402 may compare the classification for each user profile of the second set of user profiles to a predetermined classification for each user profile of the second set of user profiles. For example, profile analysis system 402 may compare the value associated with each classification of each user profile of the second set of user profiles to a corresponding value associated with a predetermined classification for each user profile of the second set of user profiles. In such an example, profile analysis system 402 may determine a difference between the classification output by the first classification model for each user profile of the second set of user profiles and the predetermined classification for each user profile of the second set of user profiles. The difference may represent an amount of error associated with the classification of each user profile of the second set of user profiles by the first classification model.

As shown by reference number 435 in FIG. 4E, profile analysis system 402 may determine a performance score for the first predictive model based on the classification of each user profile of the second set of user profiles. For example, profile analysis system 402 may determine a performance score for the first classification model based on profile analysis system 402 adding the difference between the classification output by the first classification model for each user profile of the second set of user profiles and the predetermined classification for each user profile of the second set of user profiles and dividing the sum by the total amount of user profiles included in the second set of user profiles. In such an example, the performance score for the first classification model may represent an average amount of error associated with classifications provided as output from the first classification model.

Figure 4F:
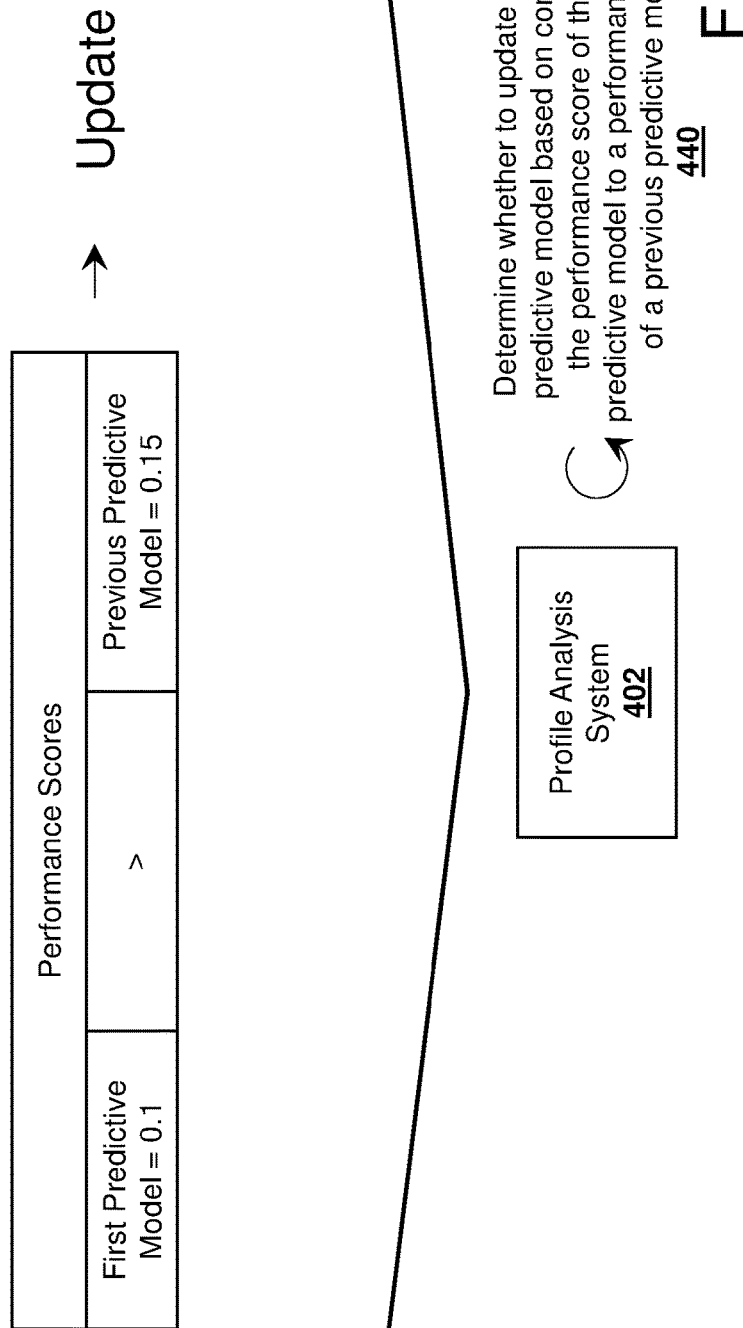

As shown by reference number 440 in FIG. 4F, profile analysis system 402 may determine whether to update the first predictive model based on comparing the first performance score of the first predictive model to a performance score of a previous predictive model. For example, profile analysis system 402 may compare the performance score of the first predictive model (e.g., 0.1 or 10% error) to a performance score of a previous predictive model (e.g., 0.15 or 15% error). In such an example, profile analysis system 402 may determine to update the first predictive model based on comparing the first performance score of the first predictive model to the performance score of a previous predictive mode and determining that the performance score of the first classification model is less than the performance score of the previous classification model (e.g., that the first classification model is associated with a lower average amount of error when providing classifications).

As shown by reference number 445 in FIG. 4G, profile analysis system 402 may determine a classification for each user profile of the first set of user profiles using the first classification model. For example, profile analysis system 402 may determine a classification (e.g., a value such as 0.2, 0.45, 0.55, and 0.7) for each user profile (e.g., Profile_1, Profile_2, Profile_3, Profile_4) of the first set of user profiles. In such an example, profile analysis system 402 may provide data associated with each user profile of the first set of user profiles as input to the first classification model and profile analysis system 402 may generate one or more outputs including the classifications for each user profile of the first set of user profiles. The classifications may represent an indication of a likelihood that a user profile is associated with the second profile type.

Figure 4H:
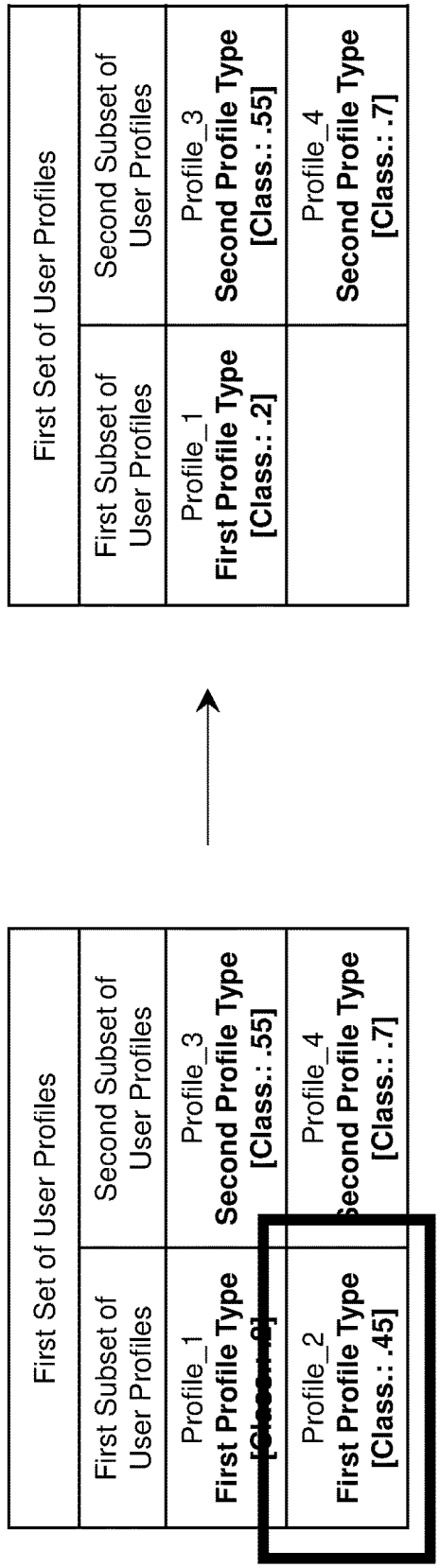
Figure 4H:

As shown by reference number 450 in FIG. 4H, profile analysis system 402 may select at least one user profile from the first subset of user profiles or the second subset of user profiles to include in a removal set of user profiles. For example, profile analysis system 402 may select the at least one user profile (e.g., Profile_2) from the first subset of user profiles or the second subset of user profiles to include in a removal set of user profiles that satisfy a removal threshold (e.g., a range of values associated with classifications of profiles to be removed such as values between 0.4-0.5).

As shown by reference number 455 in FIG. 4H, profile analysis system 402 may remove each user profile included in the removal set of user profiles from the first set of user profiles. For example, profile analysis system 402 may remove Profile_2 from the first set of user profiles based on profile analysis system 402 selecting Profile_2 from the first subset of user profiles to include in the removal set of user profiles.

Figure 4I:
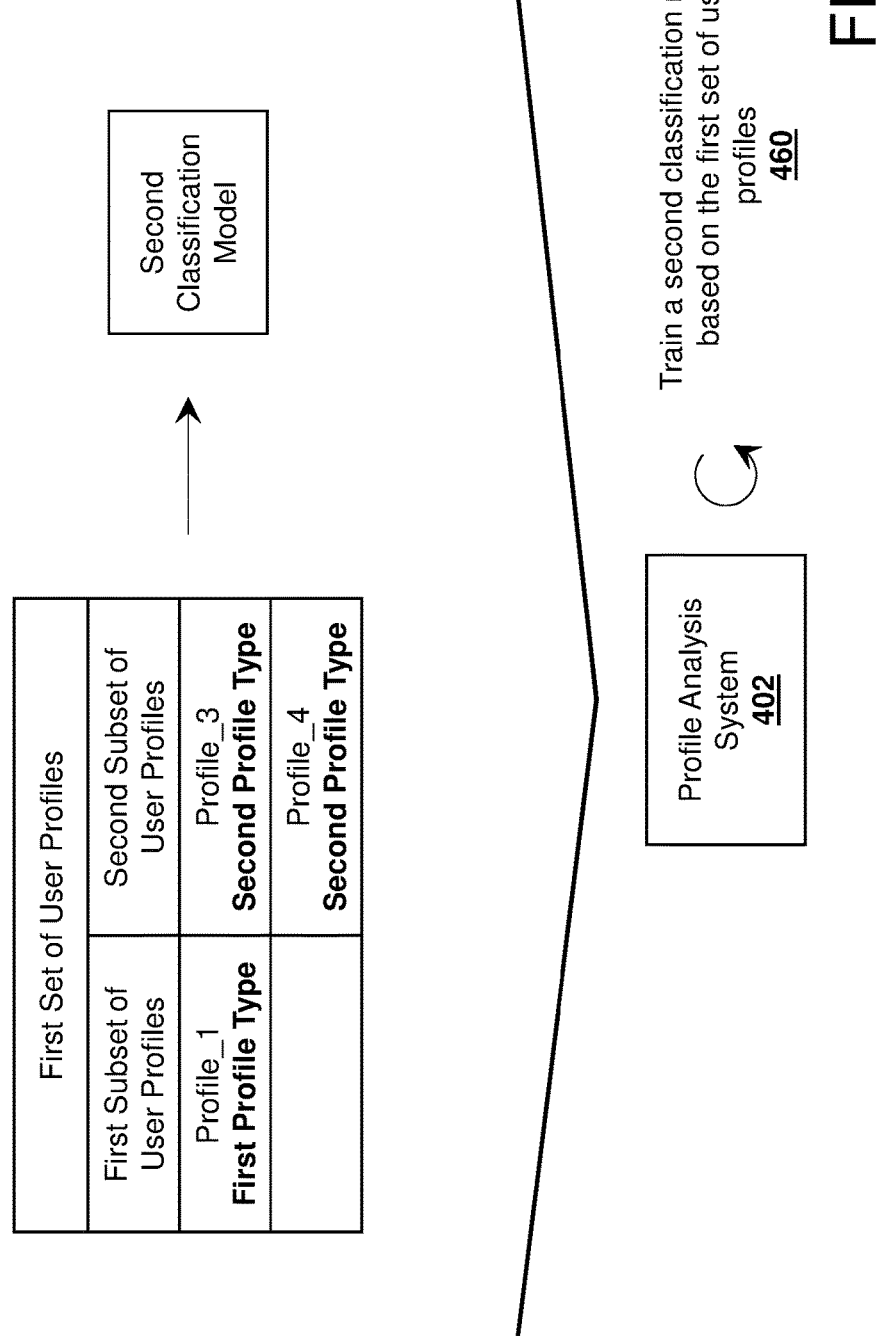

As shown by reference number 460 in FIG. 4I, profile analysis system 402 may train a second classification model based on the first set of user profiles. For example, profile analysis system 402 may train a second classification model based on the first set of user profiles. In such an example, profile analysis system 402 may train a second classification model based on the first set of user profiles and profile analysis system 402 removing user profiles selected (e.g., Profile_2) from the first set of user profiles. In some non-limiting embodiments or aspects, profile analysis system 402 may repeat portions and/or all of the process for iteratively refining a training data set, described herein.

Some non-limiting embodiments of the present disclosure are described herein in connection with a threshold. As described herein, satisfying a threshold may refer to a value being greater than the threshold, more than the threshold, higher than the threshold, greater than or equal to the threshold, less than the threshold, fewer than the threshold, lower than the threshold, less than or equal to the threshold, equal to the threshold, and/or the like.

Although the above methods, systems, and computer program products have been described in detail for the purpose of illustration based on what is currently considered to be the most practical and preferred embodiments or aspects, it is to be understood that such detail is solely for that purpose and that the present disclosure is not limited to the described embodiments or aspects but, on the contrary, is intended to cover modifications and equivalent arrangements that are within the spirit and scope of the appended claims. For example, it is to be understood that the present disclosure contemplates that, to the extent possible, one or more features of any embodiment or aspect can be combined with one or more features of any other embodiment or aspect.

What is claimed is:

1. A method, comprising:
   training, with at least one processor, a first predictive model based on a first set of user profiles, the first set of user profiles comprising:
      a first subset of user profiles associated with a first profile type, and
      a second subset of user profiles associated with a second profile type;
   determining, with at least one processor, a classification for each user profile of a second set of user profiles using the first predictive model, the classification indicating whether each user profile is associated with the first profile type or the second profile type;
   determining, with at least one processor, a performance score for the first predictive model, wherein the performance score indicates an accuracy of the first predictive model when classifying each user profile of the second set of user profiles;
   determining, with at least one processor, whether to update the first predictive model based on the performance score for the first predictive model;
   determining, with at least one processor, a classification for each user profile of the first set of user profiles using the first predictive model;
   selecting, with at least one processor, at least one user profile of the first subset of user profiles or at least one user profile of the second subset of user profiles to include in a removal set of user profiles based on the classification for each user profile of the first set of user profiles;
   removing each user profile included in the removal set of user profiles from the first set of user profiles;
   receiving data associated with a third set of user profiles;
   determining whether each user profile of the third set of user profiles is associated with the first profile type or the second profile type using the first predictive model; and
   transmitting data associated with each user profile of the third set of user profiles.

2. The method of claim 1, further comprising:
   training a second predictive model based on the first set of user profiles and the removal set of user profiles from the first set of user profiles.

3. The method of claim 2, further comprising:
   determining a performance score for the second predictive model based on the classification of each user profile of the second set of user profiles determined using the second predictive model; and
   determining whether the performance score for the second predictive model satisfies a performance score threshold.

4. The method of claim 1, wherein determining whether to update the first predictive model comprises:
   comparing the performance score for the first predictive model to a performance score of a previous predictive model, wherein the previous predictive model was trained based on a previous set of user profiles, the previous set of user profiles comprising:
      the first subset of user profiles,
      the second subset of user profiles, and at least one additional user profile that was removed from the first subset of user profiles or the second subset of user profiles based on a classification for the at least one additional user profile;
determining that the performance score for the first predictive model satisfies a performance score threshold based on comparing the performance score for the first predictive model to the performance score of the previous predictive model; and
determining to update the first predictive model based on determining that the performance score for the first predictive model satisfies the performance score threshold.

5. The method of claim 1, wherein selecting the at least one user profile of the first subset of user profiles or the at least one user profile of the second subset of user profiles to include in the removal set of user profiles comprises:
comparing the classification for each user profile of the first subset of user profiles to a first removal threshold;
determining that one or more user profiles of the first subset of user profiles satisfies the first removal threshold based on comparing the classification for each user profile of the first subset of user profiles to the first removal threshold; and
including the one or more user profiles of the first subset of user profiles in the removal set of user profiles based on determining that the one or more user profiles of the first subset of user profiles satisfies the first removal threshold.

6. The method of claim 1, wherein selecting the at least one user profile of the first subset of user profiles or the at least one user profile of the second subset of user profiles to include in the removal set of user profiles comprises:
comparing the classification for each user profile of the second subset of user profiles to a second removal threshold;
determining that one or more user profiles of the second subset of user profiles satisfies the second removal threshold based on comparing the classification for each user profile of the second subset of user profiles to the second removal threshold; and
including the one or more user profiles of the second subset of user profiles in the removal set of user profiles based on determining that the one or more user profiles of the second subset of user profiles satisfies the second removal threshold.

7. The method of claim 1, further comprising:
transferring at least one user profile from the first subset of user profiles to the second subset of user profiles;
determining whether the first set of user profiles comprises the at least one user profile that was transferred from the first subset of user profiles to the second subset of user profiles; and
determining to update the first predictive model based on determining that the first set of user profiles comprises the at least one user profile that was transferred from the first subset of user profiles to the second subset of user profiles.

8. A system, comprising:
at least one processor programmed or configured to:
train a first predictive model based on a first set of user profiles, the first set of user profiles comprising:
a first subset of user profiles associated with a first profile type, and
a second subset of user profiles associated with a second profile type;
determine a classification for each user profile of a second set of user profiles using the first predictive model, the classification indicating whether each user profile is associated with the first profile type or the second profile type;
determine a performance score for the first predictive model, wherein the performance score indicates an accuracy of the first predictive model when classifying each user profile of the second set of user profiles;
determine whether to update the first predictive model based on the performance score for the first predictive model;
determine a classification for each user profile of the first set of user profiles using the first predictive model;
select at least one user profile of the first subset of user profiles or at least one user profile of the second subset of user profiles to include in a removal set of user profiles based on the classification for each user profile of the first set of user profiles;
remove each user profile included in the removal set of user profiles from the first set of user profiles;
receive data associated with a third set of user profiles;
determine whether each user profile of the third set of user profiles is associated with the first profile type or the second profile type using the first predictive model; and
transmit data associated with each user profile of the third set of user profiles.

9. The system of claim 8, wherein the at least one processor is further programmed or configured to:
train a second predictive model based on the first set of user profiles and the removal set of user profiles from the first set of user profiles.

10. The system of claim 8, wherein the at least one processor is further programmed or configured to:
determine a performance score for a second predictive model based on the classification of each user profile of the second set of user profiles determined using the second predictive model; and
determine whether the performance score for the second predictive model satisfies a performance score threshold.

11. The system of claim 8, wherein, when determining whether to update the first predictive model, the at least one processor is programmed or configured to:
determine that the performance score for the first predictive model satisfies a performance score threshold; and
determine to update the first predictive model based on determining that the performance score for the first predictive model satisfies the performance score threshold.

12. The system of claim 8, wherein, when selecting the at least one user profile of the first subset of user profiles or the at least one user profile of the second subset of user profiles to include in the removal set of user profiles, the at least one processor is programmed or configured to:
compare the classification for each user profile of the first subset of user profiles to a first removal threshold;
determine that one or more user profiles of the first subset of user profiles satisfies the first removal threshold based on comparing the classification for each user profile of the first subset of user profiles to the first removal threshold; and
include the one or more user profiles of the first subset of user profiles in the removal set of user profiles based on determining that the one or more user profiles of the first subset of user profiles satisfies the first removal threshold.

13. The system of claim 8, wherein, when selecting the at least one user profile of the first subset of user profiles or the at least one user profile of the second subset of user profiles to include in the removal set of user profiles, the at least one processor is programmed or configured to:
    compare the classification for each user profile of the second subset of user profiles to a second removal threshold;
    determine that one or more user profiles of the second subset of user profiles satisfies the second removal threshold based on comparing the classification for each user profile of the second subset of user profiles to the second removal threshold; and
    include the one or more user profiles of the second subset of user profiles in the removal set of user profiles based on determining that the one or more user profiles of the second subset of user profiles satisfies the second removal threshold.

14. The system of claim 8, wherein the at least one processor is further programmed or configured to:
    transfer at least one user profile from the first subset of user profiles to the second subset of user profiles; and
    determine whether the first set of user profiles comprises the at least one user profile that was transferred from the first subset of user profiles to the second subset of user profiles, and
    wherein, when determining whether to update the first predictive model, the at least one processor is programmed or configured to:
        determine to update the first predictive model based on determining that the first set of user profiles comprises the at least one user profile that was transferred from the first subset of user profiles to the second subset of user profiles.

15. A computer program product comprising at least one non-transitory computer-readable medium including one or more instructions that, when executed by at least one processor, cause the at least one processor to:
    train a first predictive model based on a first set of user profiles, the first set of user profiles comprising:
        a first subset of user profiles associated with a first profile type, and
        a second subset of user profiles associated with a second profile type;
    determine a classification for each user profile of a second set of user profiles using the first predictive model, the classification indicating whether each user profile is associated with the first profile type or the second profile type;
    determine a performance score for the first predictive model, wherein the performance score indicates an accuracy of the first predictive model when classifying each user profile of the second set of user profiles;
    determine whether to update the first predictive model based on the performance score for the first predictive model;
    determine a classification for each user profile of the first set of user profiles using the first predictive model;
    select at least one user profile of the first subset of user profiles or at least one user profile of the second subset of user profiles to include in a removal set of user profiles based on the classification for each user profile of the first set of user profiles;
    remove each user profile included in the removal set of user profiles from the first set of user profiles;
    receive data associated with a third set of user profiles;
    determine whether each user profile of the third set of user profiles is associated with the first profile type or the second profile type using the first predictive model; and
    transmit data associated with each user profile of the third set of user profiles.

16. The computer program product of claim 15, wherein the one or more instructions further cause the at least one processor to:
    train a second predictive model based on the first set of user profiles and the removal set of user profiles from the first set of user profiles.

17. The computer program product of claim 15, wherein the one or more instructions further cause the at least one processor to:
    determine a performance score for a second predictive model based on the classification of each user profile of the second set of user profiles determined using the second predictive model; and
    determine whether the performance score for the second predictive model satisfies a performance score threshold.

18. The computer program product of claim 15, wherein the one or more instructions that cause the at least one processor to determine whether to update the first predictive model, cause the at least one processor to:
    determine that the performance score for the first predictive model satisfies a performance score threshold; and
    determine to update the first predictive model based on determining that the performance score for the first predictive model satisfies the performance score threshold.

19. The computer program product of claim 15, wherein the one or more instructions that cause the at least one processor to select the at least one user profile of the first subset of user profiles or the at least one user profile of the second subset of user profiles to include in the removal set of user profiles based on the classification for each user profile of the first set of user profiles, cause the at least one processor to:
    compare the classification for each user profile of the first subset of user profiles to a first removal threshold;
    determine that one or more user profiles of the first subset of user profiles satisfies the first removal threshold based on comparing the classification for each user profile of the first subset of user profiles to the first removal threshold; and
    include the one or more user profiles of the first subset of user profiles in the removal set of user profiles based on determining that the one or more user profiles of the first subset of user profiles satisfies the first removal threshold.

20. The computer program product of claim 15, wherein the one or more instructions that cause the at least one processor to select the at least one user profile of the first subset of user profiles or the at least one user profile of the second subset of user profiles to include in the removal set of user profiles based on the classification for each user profile of the first set of user profiles, cause the at least one processor to:
    compare the classification for each user profile of the second subset of user profiles to a second removal threshold;
    determine that one or more user profiles of the second subset of user profiles satisfies the second removal threshold based on comparing the classification for each user profile of the second subset of user profiles to the second removal threshold; and include the one or more user profiles of the second subset of user profiles in the removal set of user profiles based on determining that the one or more user profiles of the second subset of user profiles satisfies the second removal threshold.

\* \* \* \* \*